US006499866B1

(12) United States Patent
Logan et al.

(10) Patent No.: US 6,499,866 B1
(45) **Date of Patent: *Dec. 31, 2002**

(54) EMERGENCY LIGHTING UNIT/EXIT SIGN COMBINATION

(75) Inventors: Mark Campbell Logan, Doraville, GA (US); Andrew Edward Masters, Berlin, MD (US); Edwin Lewis Hull, Conyers, GA (US)

(73) Assignee: Acuity Brands, Inc., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 09/703,322

(22) Filed: Oct. 31, 2000

Related U.S. Application Data

(63) Continuation of application No. 09/132,814, filed on Aug. 12, 1998, now Pat. No. 6,142,648, which is a continuation of application No. 08/561,956, filed on Nov. 22, 1998, now Pat. No. 5,797,673.

(51) Int. Cl.[7] .................................................. B60Q 3/04
(52) U.S. Cl. ....................... 362/362; 362/234; 362/249; 362/370; 362/812; 40/570
(58) Field of Search ................................ 362/201, 812, 362/234, 250, 370, 362

(56) References Cited

U.S. PATENT DOCUMENTS

| | | | |
|---|---|---|---|
| 3,402,494 | A | 9/1968 | Gray |
| 3,478,455 | A | 11/1969 | Fremont |
| 3,665,626 | A | 5/1972 | Lund et al. |
| 3,772,527 | A | 11/1973 | Darling et al. |
| 3,924,344 | A | 12/1975 | Davis |
| 3,931,689 | A | 1/1976 | Shine |
| 4,071,749 | A | 1/1978 | Balogh |
| 4,162,779 | A | 7/1979 | Steenhoven et al. |
| 4,222,093 | A | 9/1980 | Garcia |

(List continued on next page.)

FOREIGN PATENT DOCUMENTS

| | | |
|---|---|---|
| EP | 0412281 A1 | 2/1991 |

OTHER PUBLICATIONS

Emergi–Lite Series EXPK–SOX/STX NEMA 4X Mini Systems Weatherproof, Corrosion–Resistant Emergency Exit/Lighting System product brochure—1992.

(List continued on next page.)

*Primary Examiner*—Stephen Husar
(74) *Attorney, Agent, or Firm*—Kenneth E. Darnell

(57) ABSTRACT

An emergency lighting fixture combining the functions of an illuminated sign such as an exit sign and an emergency lighting unit integrated into one housing onto which one or more emergency lights can be mounted at predetermined locations of the housing, the combined emergency lighting structure providing both exit location information and ambient emergency lighting in a single cooperatively operating device. The present device replaces bulky prior combinations of discrete exit signs and emergency lighting units which have been assembled together essentially as individual devices without integration into a single housing or without substantial integration of operational features, the housing of the present device being only slightly larger than standard exit signage. The present fixture is preferably formed from light weight materials such as polycarbonate/ABS or sheet metal configured to mount in tension internal weight such as weight due to enlarged battery mass and the like as well as externally mounted emergency lights. Manufacture of the present fixture is improved by the ability to mold major portions of the fixture from suitable polymeric materials, thereby allowing formation of substantial portions of the fixture located internally of the housing integrally with the housing to substantially reduce the number of parts necessary to be assembled together in an assembly situation. Assembly, installation and maintenance of a molded fixture according to the invention is further improved by the ability to snap-fit together all structural elements of the fixture both internally and externally of the housing.

31 Claims, 26 Drawing Sheets

U.S. PATENT DOCUMENTS

| | | | | | |
|---|---|---|---|---|---|
| 4,255,756 | A | | 3/1981 | Johnson et al. | |
| 4,355,479 | A | | 10/1982 | Thornton | |
| 4,435,743 | A | | 3/1984 | Plumly | |
| 4,466,208 | A | | 8/1984 | Logan et al. | |
| 4,516,203 | A | | 5/1985 | Faber et al. | |
| 4,600,972 | A | | 7/1986 | MacIntyre | |
| 5,018,290 | A | | 5/1991 | Kozek et al. | |
| 5,151,679 | A | | 9/1992 | Dimmick | |
| 5,247,756 | A | | 9/1993 | Johnstone | |
| 5,272,605 | A | | 12/1993 | Johnstone | |
| 5,376,020 | A | | 12/1994 | Jones | |
| 5,448,843 | A | | 9/1995 | Schwartz | |
| 5,459,955 | A | | 10/1995 | Ruskouski et al. | |
| 5,461,550 | A | | 10/1995 | Johnstone | |
| 5,526,251 | A | | 6/1996 | Andre et al. | |
| 5,539,623 | A | | 7/1996 | Gurz et al. | |
| 5,611,163 | A | | 3/1997 | Smith | |
| 5,768,814 | A | | 6/1998 | Kozek et al. | |
| 5,797,673 | A | * | 8/1998 | Logan et al. | 362/234 |
| 5,988,825 | A | * | 11/1999 | Masters et al. | 362/20 |
| 6,142,648 | A | * | 11/2000 | Logan et al. | 362/234 |
| 6,152,581 | A | * | 11/2000 | Masters et al. | 362/362 |

OTHER PUBLICATIONS

Photograph No. 20 depicting the Emergi–Lite EXPK Series Product—admitted prior art.

Photograph No. 21 depicting the Emergi–Lite EXPK Series Product—admitted prior art.

Photograph No. 22 depicting the Emergi–Lite EXPK Series Product—admitted prior art.

Photograph No. 23 depicting the Emergi–Lite EXPK Series Product—admitted prior art.

Photograph No. 24 depicting the Emergi–Lite EXPK Series Product—admitted prior art.

Photograph No. 25 depicting the Emergi–Lite EXPK Series Product—admitted prior art.

Photograph No. 26 depicting the Emergi–Lite EXPK Series Product—admitted prior art.

Photograph No. 27 depicting the Emergi–Lite EXPK Series Product—admitted prior art.

Photograph No. 28 depicting the Emergi–Lite EXPK Series Product—admitted prior art.

Dual–Lite EXquIsiTe RG Series product brochure—1988.

Elan Lighting Product Series ED Combination Emergency Light/Exit Sign product brochure—1987.

Photograph No. 31 depicting the Elan EEDA unit—admitted prior art.

Photograph No. 32 depicting the Elan EEDA unit—admitted prior art.

Photograph No. 33 depicting the Elan EEDA unit—admitted prior art.

Photograph No. 34 depicting the Elan EEDA unit—admitted prior art.

Photograph No. 35 depicting the Elan EEDA unit—admitted prior art.

Photograph No. 36 depicting the Elan EEDA unit—admitted prior art.

Photograph No. 37 depicting the Elan EEDA unit—admitted prior art.

Prescolite Emergency Systems NEX Series exit sign product brochure—admitted prior art.

AtLite Lighting Equipment Series LCNY8 Exit Sign/Emergency Light product brochure—admitted prior art.

YorkLite Designer Exit Light product brochure—1989.

Pathway NEMA 4X LED Exit sign product brochure—Oct. 1995.

Exitronix LED Emergency Exit sign with Emergency Lights product brochure—admitted prior art.

Dual–Lite Metropolitan NYHX Series instructions for operation and installation—Nov. 1989.

Dual–Lite Metropolitan NYHX Series product brochure—admitted prior art.

Brochure, "Kast Exits—Stencil or Plastic Face," Incandescent Catalog, Lithonia Lighting, Inc. p. 26 (1995).

Brochure, "Fail–Safe Exit Sign," Lithonia Lighting (1971).

Brochure, "Exit Series—Plastic Face," Lithonia Lighting, p. 64 (1971).

Brochure, "ES/EP Premium Exits," Lithonia, p. 52 (1980).

Brochure, "AS/AP Incandescent Series," Lithonia Emergency Lighting, p. 24, (1984).

Installation Instructions, "Spectrum Series Model MS/MP 120/277 Exit Signs," Lithonia Emergency Systems (Jul. 28, 1986).

Drawing, "L.A. Swivel Male," (Jul. 7, 1986).

One page of photographs, Lithonia Lighting Systems Emergency Exit Sign as shown in Brochure, "Spectrum Series—Emergency Exit," Lithonia Emergency Systems (1987) listed below.

One page of photographs, Lithonia Lighting Systems Emergency Exit Sign with Chevrons as shown in Brochure, "Introducing the New QM–EL Quantum Emergency Exit Sign," Lithonia Lighting (1992) listed below (Chevron Sign).

One page of photographs, Model KSR–LED EZ Snap Series Exit Sign, Dual Lite (Oct. 26, 1994) ("Dual Lite Sign") as shown in installation instructions, EZ Snap LED Exit Signs, Dual–Lite (Jul. 1994) listed below.

One page of photographs, (Cam Attachment (Long)) shown in Drawing, "Pin, Locking, Pedestal Swivel," (Mar. 30, 1989) and Brochure, Installation Instructions Titan Series (Circa 1989), listed below.

One page of photographs (Cam Attachment (Short)) shown in Drawing, "Swivel, Lamp, Par 36," (Oct. 5, 1993) listed below.

Copy of photograph of Swivel shown in Drawing, "L.A. Swivel Male," (Jul 7, 1986) listed below.

One page of photographs, canopy/backplate shown in Brochure, "Dual–Lite Excite Simply Beautiful," Dual–Lite, Inc. (Jul. 1980) listed below.

One page of photographs, canopy housing shown in Brochure, "Introducing the Quantum Difference," Lithonia Emergency Systems (1989) listed below.

Brochure, "6 Volt Self–Powered Economy Exit Light—Series EP," Elan Lighting Products Division of Altus Corporation (Apr. 1982).

Brochure, "6 Volt Combination Emergency Light/Exit Sign—Series ED," Elan Lighting Products Division of Altus Corporation (Apr. 1982).

Brochure, "Standard and AC–DC Signs—Series WX & BX," Elan Lighting Products Division of Altus Corporation (Sep. 1982).

Brochure, "Chloride . . . the quality innovators—Signout Self–powered AC/DC exit signs," Chloride Systems, (Sep. 1982).

Brochure, "Universal Module Exit Signs—XU Series, AC or AC/DC," Teledyne Big Beam, (Mar. 1989).
Brochure, "Universal Module Exit Signs—XU Series, AC or AC/DC," Teledyne Big Beam, (Aug. 1990).
Brochure, "Dynaray Emergency Lighting—81 Series," Electro Powerpacs Corp. (Jun. 1990).
Brochure, "The New Siltron UX Series—Extruded Aluminum Scaled Maintenance–Free Nickel Cadmium Batteries," Siltron Illumination, Inc. (undated).
Brochure, "Fluorescent Emergency Light Power Pack—CFP Series," Chloride Systems, pp. 11–18, (undated).
Brochure, "Chloride . . . Life Safety Products & Systems—Total Flexibility in a Single Exit Sign," Chloride Systems (undated).
Linn, Charles A I A "From Frog Eyes on a Lunch Box to Subtle, Quality Emergency Fixtures," Lighting Update, *Facilities Design & Management,* p. 47 (undated).
Installation Instructions, "EZ–Snap LED Exit Signs," Dual–Lite (Jul. 1994).
Drawing, "Pin, Locking, Pedestal Swivel," (Mar. 30, 1989).
Brochure, "Installation Instructions Titan Series," (Circa 1989).
Drawing, "Swivel, Lamp Par 36," (Oct. 5, 1993).
Brochure, "Open the Door to a Spectrum of Opportunity," Lithonia Emergency Systems, (1987).
Brochure, "Spectrum Series—Comtemporary Injection Molded Emergency Exit Signs," Lithonia Emergency Systems (1987).
Brochure, "Spectrum Series—Emergency Exit," Lithonia Emergency Systems (1987).
Brochure, "Introducing the Quantum Difference," Lithonia Emergency Systems (1989).
Brochure, "FAS/FAP Fluorescent Series," Lithonia Emergency Lighting, p. 25, (undated).
Brochure, "Introducing the New QM–EL Quantum Emergency Exit Sign," Lithonia Lighting (1992).
Brochure, "Your Choice of Exit Signs Can Make a World of Difference," Lithonia Lighting (1993).
Installation Instructions and Supplement, "Quantum Series—Model M 120/277 Exit Signs," Lithonia Emergency Systems, (undated).
Installation Instructions, "QM–EL Emergency Exit Signs," Lithonia Emergency Systems (undated).
Brochure, "Dual–Lite EXITE Simply Beautiful," Dual–Lite, Inc., (Jul. 1980).
Brochure, "Excalibur® Series," Dual–Lite, (undated).
Brochure, "Excite™ Series" Dual–Lite, (Mar. 1988).
Brochure, "EZ–Snap™ Series," Dual–Lite, (Sep. 1990).
Installation Instructions, "Dual–Lite EZ–SNAP® Exit Signs," (Jan. 1994).
Brochure, "Single and Dual Lamp Fluorescent AC and Emergency Universal Mounting Exit Signs," pp. 27–28, (undated).

* cited by examiner

Fig. 17d
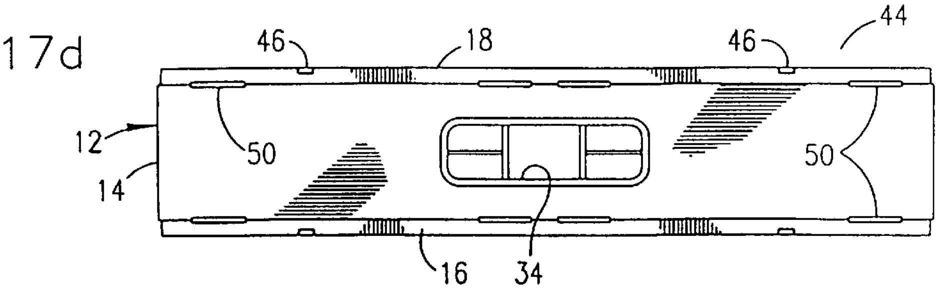
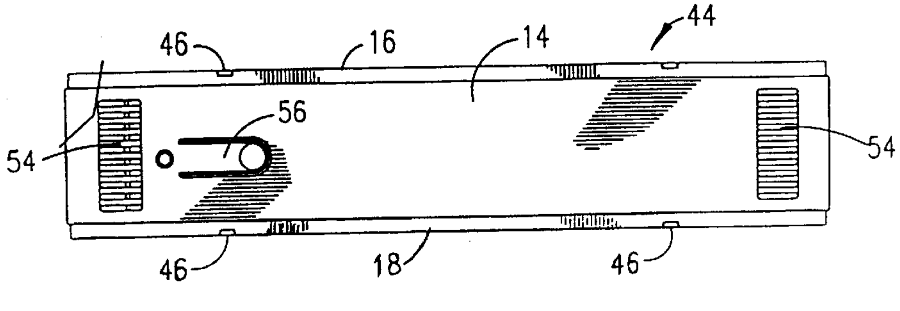
Fig. 17e 52
286

368
366
52
52
286

52
286
52

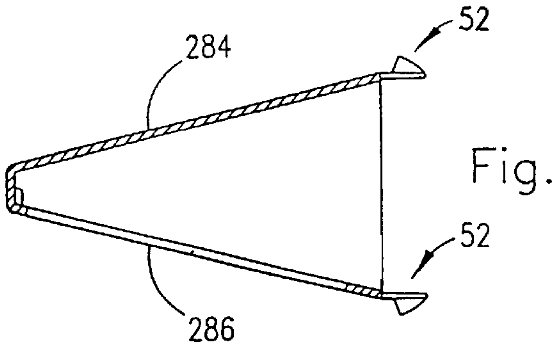
Fig. 27b
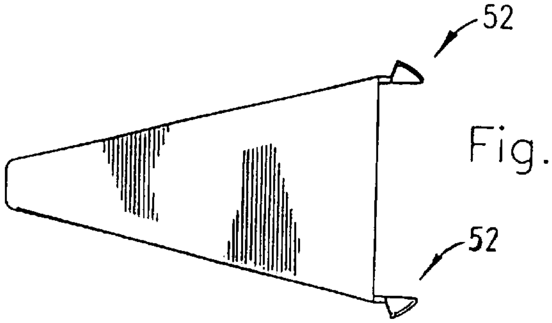
Fig. 27d
Fig. 27f
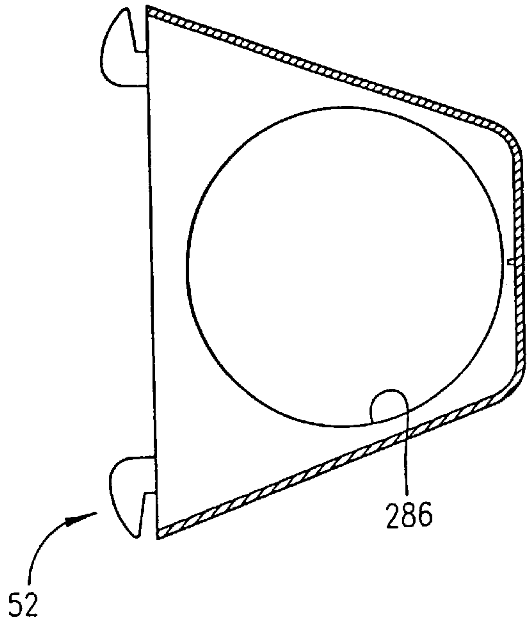

EMERGENCY LIGHTING UNIT/EXIT SIGN COMBINATION

CROSS REFERENCE TO RELATED APPLICATION

This application is a continuation of application Ser. No 09/132,814, filed Aug. 12, 1998, now U.S. Pat. No. 6,142,648 which is a continuation of application Ser. No. 08/561,956, filed Nov. 22, 1998, now U.S. Pat. No. 5,797,673, issued Aug. 25, 1998, by the same inventors and assigned to the same assignee, said prior applications being incorporated hereinto by reference.

DESCRIPTION OF THE PRIOR ART

1. Field of the Invention

The invention relates generally to emergency lighting fixtures including illuminated signs and emergency lighting units and particularly relates to combinations of illuminated exit signs and the like with emergency lighting units to form fixtures having multiple emergency lighting functions in a single device.

2. Background of the Invention

Emergency lighting capability is mandated by building codes throughout most of the world for commercial buildings in particular. The most common type of emergency lighting is the exit sign which is also the most noticed due not only to its ubiquity but also due to the fact that most exit signs are constantly illuminated and are therefore readily seen. Exit signs are typically placed above doorways or in egress paths to indicate in a time of emergency the most efficient manner of exiting a building. Another common form of emergency lighting is generally referred to as an emergency lighting unit and typically operates two spaced lamps which are often referred to as "frog eyes". Emergency lighting units operate only in the event of emergency and are intended to supply an acceptable degree of ambient illumination under emergency conditions, these conditions usually including loss of normal power. Since emergency conditions requiring the most immediate and effective use of both exit signs and emergency lighting units are normally associated with mains power loss, backup power is necessary for the continued operation of an exit sign and for start-up and continuing operation of an emergency lighting unit. This back-up power is provided by batteries, a typical exit sign having a battery and circuitry capable of switching to DC battery power from AC mains power on loss of AC power to the exit sign. An emergency lighting unit includes a battery and sensing circuitry which initiates operation of the battery on loss of normal building power, the lamps of the emergency lighting unit being then activated to provide emergency lighting. These two forms of emergency lighting, the exit sign and the emergency lighting unit, are placed in a building structure at locations requiring a particular function of each form. Certain situations require the use of both forms of emergency lighting in one location. Rather than USQ separate lighting fixtures in one particular location, common practice has been to use a "combination" exit sign and emergency lighting unit, this type of fixture being commonly referred to as an exit/unit combo. The "combo" has previously taken the form of an emergency lighting unit mounted to an exit sign, the emergency lighting unit most often being mounted along the top of the exit sign. In most instances, the exit sign and the emergency unit operate separately although certain functions can be shared between the exit sign and the unit by providing common circuitry such as would be useful to detect power line failure for switching the exit sign to DC battery power and for initiating operation of the emergency lighting unit. A particular exit/unit combo which has enjoyed substantial market acceptance is the QUANTUM Exit/Unit Combo manufactured by Lithonia Lighting, Inc. of Conyers, Ga., a wholly owned subsidiary of National Service Industries, Inc., of Atlanta, Ga., QUANTUM being a trademark of National Service Industries, Inc. The widespread use of the Lithonia Lighting combo has been brought about at least in part due to the reduced labor costs associated with installation of the Lithonia combo on site, the exit sign and the emergency lighting unit being factory assembled and prewired for shipment to a job site in a configuration allowing rapid and simultaneous final wiring of both the exit sign and the emergency lighting unit. Further, the Lithonia combo manufactured and marketed under the QUANTUM mark is comprised of a substantially all-plastic exit sign and a substantially all-plastic emergency lighting unit, thereby resulting in a combo product which is light in weight relative to previous combo products many of which included metal housings and parts which caused the products to be heavy and therefore more difficult to support especially in end mounted installations. The Lithonia QUANTUM combo could be rapidly and easily mounted at the top, back or ends with adequate support of the assembly being possible even when end mounted. Manufacture and maintenance of the Lithonia combo were facilitated by the virtual all-plastic structure of the Lithonia product which allows at least portions of the product to be positively and readily snap-fitted to each other. While the QUANTUM combo evidenced significant advantages in this art, the combination of two essentially different and distinct forms of emergency lighting into a single product with both the exit sign and the emergency lighting unit retaining its own housing inter alia such as would be employed in their separate use has caused combo products to continue being somewhat bulky in size and to be less attractive than most other forms of emergency lighting have become in recent years as the industry has devoted increased attention to the appearance of emergency lighting products generally.

Accordingly, the art has experienced a long-felt and continuing need for improvement of a combination exit sign and emergency lighting unit or combo product to the end that such products become a true integration of an exit sign and an emergency lighting unit capable of supporting the weights of batteries necessary for providing power to both sides of an exit sign as well as unit lamps including remote unit lamps. In addition to the need to support greater battery weights than previously necessary in exit signs alone, the need exists in a combo to support greater weight than is normally experienced with an exit sign per se so that a combo can be safely and positively mounted in wall or ceiling installations. The art has thus felt the need for the present combo invention which integrates the functions of an exit sign and an emergency lighting unit into a single housing with repositionable lamping elements mounted to exterior portions of the housing. The structure of the present exit/unit combo allows support of battery loads in tension rather than through the usual cantilevered support of loads disposed internally of a sign housing. The structure of the present combo housing provides support of such efficiency as to prevent warping or bowing of the housing over time, thereby providing substantially improved product quality along with substantially improved product appearance. The exit/unit combo of the invention is provided with significant structural features useful not only with the combo but also with exit signs per se and with emergency lighting units per se as well as remote emergency lighting units., The present invention thus provides substantial improvement over the prior art by the provision of an integral and integrated exit/unit combo characterized by ease of assembly, installation and maintenance as well as by extraordinarily acceptable appearance.

SUMMARY OF THE INVENTION

The invention provides an emergency lighting fixture which combines the functions of an illuminated sign, particularly an exit sign, with an emergency lighting unit, the structural combination being integrated into a single housing which internally contains those structural elements necessary to produce the functions of the feature and which carries emergency lamping externally of the housing at multiple locations thereby providing extraordinary flexibility in use. The present combination of an exit sign and an emergency lighting unit or "exit/unit combo" is preferably formed of a polymeric material such as polycarbonate/ABS, thereby allowing molding of a fixture housing with most of the structural elements necessary to produce the functions of the fixture being integrally formed with the housing, these molded structural elements and other structure contained within the housing being located in the housing in a manner whereby the elements combine to produce synergistic effects in addition to the primary functions of the structural elements, the fixture being totally integrated as to structure and function as well as being substantially integral in construction. Formation of the fixture essentially from moldable material further allows integral formation of snap-fitting structural elements which not only provide easy snap fitting of facing plates to the housing to form the primary structural portion of the combo per se but also the integral formation of snap-fitting structure with bulb holders, battery mounting elements and option board storage elements inter alia. Assembly of the fixture is therefore facilitated at least in part due to the reduced number of individual parts occasioned by the integral nature of the housing inter alia.

The housing of the present exit/unit combo fixture is configured to support battery weights inter alia which are typically greater than those battery weights encountered in conventional exit signs due to the need to operate exit lighting, unit lighting and even remote unit lighting with a single battery disposed within the housing. In order to accommodate greater battery weight and the weight of the fixture itself, the battery is centered with the housing disposed at a lower portion thereof, battery location couples with a central, vertical structural beam known as a "ladder" allows support of the battery inter alia in tension rather than in a cantilevered arrangement as has been previously employed in exit signs and the like. The structural features such as the ladder integrated with location of major weighting such as the weight of the battery actually allows use of a material such as plastic for formation of the fixture, the self-support provided by the structure itself preventing warping and bowing of the plastic exit/unit combo fixture over time such as would occur with a fixture having the weight of the exit/unit combo fixture if not provided with the integrated structural relationships of the invention. The dimensional stability of the present exit/unit combo fixture occurs due to the structural features of the fixture which maintain substantial portions of the fixture weight in tension.

The exit/unit combo fixture of the invention provides "unit" emergency lighting by the disposition of one or more emergency lamps mountable at different locations on the periphery of the fixture housing to accommodate differing lighting situations. The lamps are mounted by lamp holders fitted with swiveling concentric spherical structural elements which allow movement of the lamps with a degree of freedom not previously possible, the structure of the concentric spherical elements additionally yielding a compact profile which is not only attractive in appearance but functional due to the volumetric efficiency thus provided. The lamp holders of the invention are formed with torsion snap elements which fit into slots formed in peripheral edges of the housing, the slots receiving the snap elements of the lamp holders to positively mount the lamp holders in desired locations on the fixture. The particular snap element/slot arrangement of the invention allows rapid and ready mounting and dismounting of the lamp holders to and from the fixture housing with positive locking of the lamp holders to the housing once assembled. The lamp holders of the invention can be removed from the present fixture and mounted to remote slave mounting stations driven by the fixture with the snap elements of the lamp holder fitting into arranged slots of the slave station. Further, the lamp holder can be mounted to a station separate from the fixture with battery or other operation, the lamp holder being mounted to the station through use of the snap elements of the lamp holder in cooperation with slots formed in the station.

Various other features of the invention include structure for minimizing the "shadow" of the battery appearing through face plates of the exit/unit combo fixture; registration structure for mounting of a diffusion panel in a face plate of the fixtures; routing of wiring in association with the ladder support and in front of the battery with the use of slack in the wiring and structure for compartmentalization of electrical components within the interior of the fixture housing including snap-mounting of a capacitor inter alia. Many of the inventive features disclosed herein are useful in fixtures other than exit/unit combo fixtures and are disclosed for use in that variety of fixtures for which these features find utility. Use of these features is thus not limited to use in an exit/unit combo fixture.

Accordingly, it is an object of the invention to provide an integral exit/unit combo fixture having the capabilities of an exit sign and of an emergency lighting unit integrated into a fixture formed with a single housing for containing a substantial portion of the structures and for mounting emergency unit lamps on the housing externally thereof and at repositionally distinct locations of the housing.

It is another object of the invention to provide an integral exit/unit combo fixture substantially moldable of a polymeric material to allow formation of substantial structural portions of the fixture with a fixture housing, the housing and associated face plates being rapidly fitted together with snap features, components of the fixture internally of the housing being snap-fitted to the housing for rapid assembly thereof, structure holding emergency lighting lamping further being rapidly snap-fitted to the housing at predetermined locations on the exterior of the housing.

It is a further object of the invention to provide an integral exit/unit combo fixture substantially moldable of a polymeric material with structural support features providing dimensional stability to the fixture thereby minimizing warping and bowing of the fixture over time in spite of substantial weight occasioned by the use of heavy batteries as well as the weight of the fixture itself, the fixture including internal support elements which mount battery weight as well as the weight of the fixture per se substantially in tension.

It is a still further object of the invention to provide an integral exit/unit combo fixture having unit lighting provided by lamps mounted on exterior portions of the fixture by lamp holders mounted to the fixture by tension snap elements, each lamp being mounted by a swiveling double concentric structure which allows an extraordinary range of movement of the lamp and which allows formation of the unit lighting structure with a compact profile, the fixture requiring a reduced volume and vertical height for mounting of the fixture, the fixture being also mountable with the back of the fixture directly against a flat surface such as a wall.

Further objects and advantages of the invention will become more readily apparent in light of the following detailed description of the preferred embodiments.

BRIEF DESCRIPTION OF THE DRAWINGS

FIGS. 17A–E are elevational view of the frame of the invention;

FIGS. 27A–27F are views illustrating operation of the torsion snaps of the invention;

DESCRIPTION OF THE PREFERRED EMBODIMENTS

Figure 1:
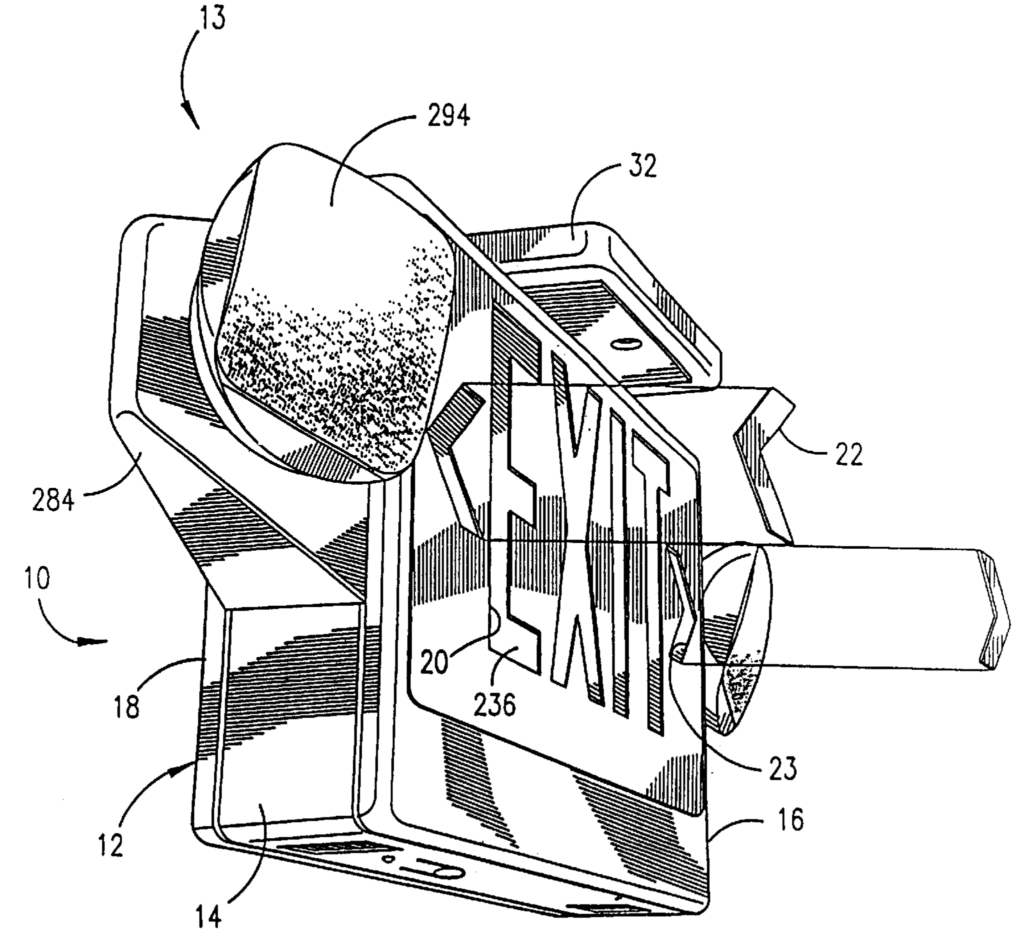
FIG. 1 is a perspective view of a first embodiment of the invention.
Figure 2:
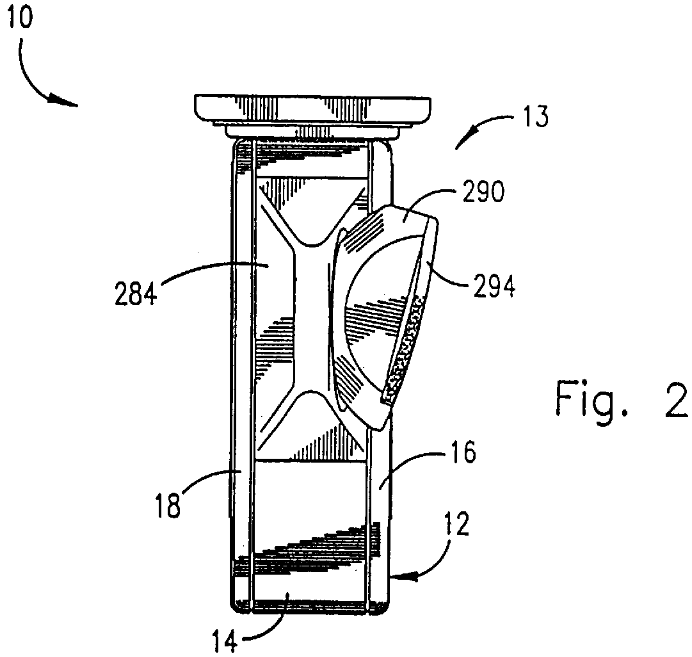
FIG. 2 is a side elevational view of the embodiment of the invention shown in FIG. 1.

Referring now to the drawings, and particularly to FIGS. 1 and 2, a combination exit sign/emergency unit fixture is seen at 10 to be comprised of a housing 12 and two emergency lighting unit lamp assemblies 13. The fixture 10 will generally be referred to herein as the combo fixture 10 or merely as the fixture 10. The housing 12 is essentially formed from frame 14 and face plate 16 as well as back plate 18. In certain embodiments of the invention, the back plate 18 can be essentially identical to the face plate 16, such a combo fixture 10 within constituting a double-faced fixture having indicia 20 on both faces thereof such as can occur in top and end mounted installations. In a direct wall-mounted installation, the back plate 18 is necessary in order for the combo fixture 10 to be mounted directly to a wall as will be described hereinafter.

The combo fixture 10 is typically provided with one or more directional indicators 22 which are often referred to as "chevrons", the indicators 22 preferably comprising snap-fitting chevron structures which can be rapidly and positively mounted into openings 23 formed on the face plate 16 without the requirement for gaining access into the interior of the housing 12. While various chevron structures can be utilized, a particularly suitable structure is disclosed in United States patent application Ser. No. 08/327,487, filed Oct. 21, 1994, now U.S. Pat. No. 5,611,163 by Stephen T. Smith with the title "Direction Indicator Covers for Emergency Lighting System", the patent application being assigned to the assignee of the present patent application, the disclosure of Ser. No. 08/327,487, now U.S. Pat. No. 5,611,163 being incorporated hereinto by reference. Depending upon the exigencies of a particular installation, at least one of the indicators 22 is mated into the corresponding opening 23 to prevent light generated interiorly of the housing 12 from passing through the opening 23. In certain installations wherein the combo fixture 10 may be placed directly over a doorway or the like, it is possible that both of the indicators 22 will be placed in the corresponding openings 23. Certain other installations may require that neither of the directional indicators 22 be mounted in the corresponding openings 23, such an installation signalling that a path of egress may exist to both sides of the combo fixture 10.

Figure 9:
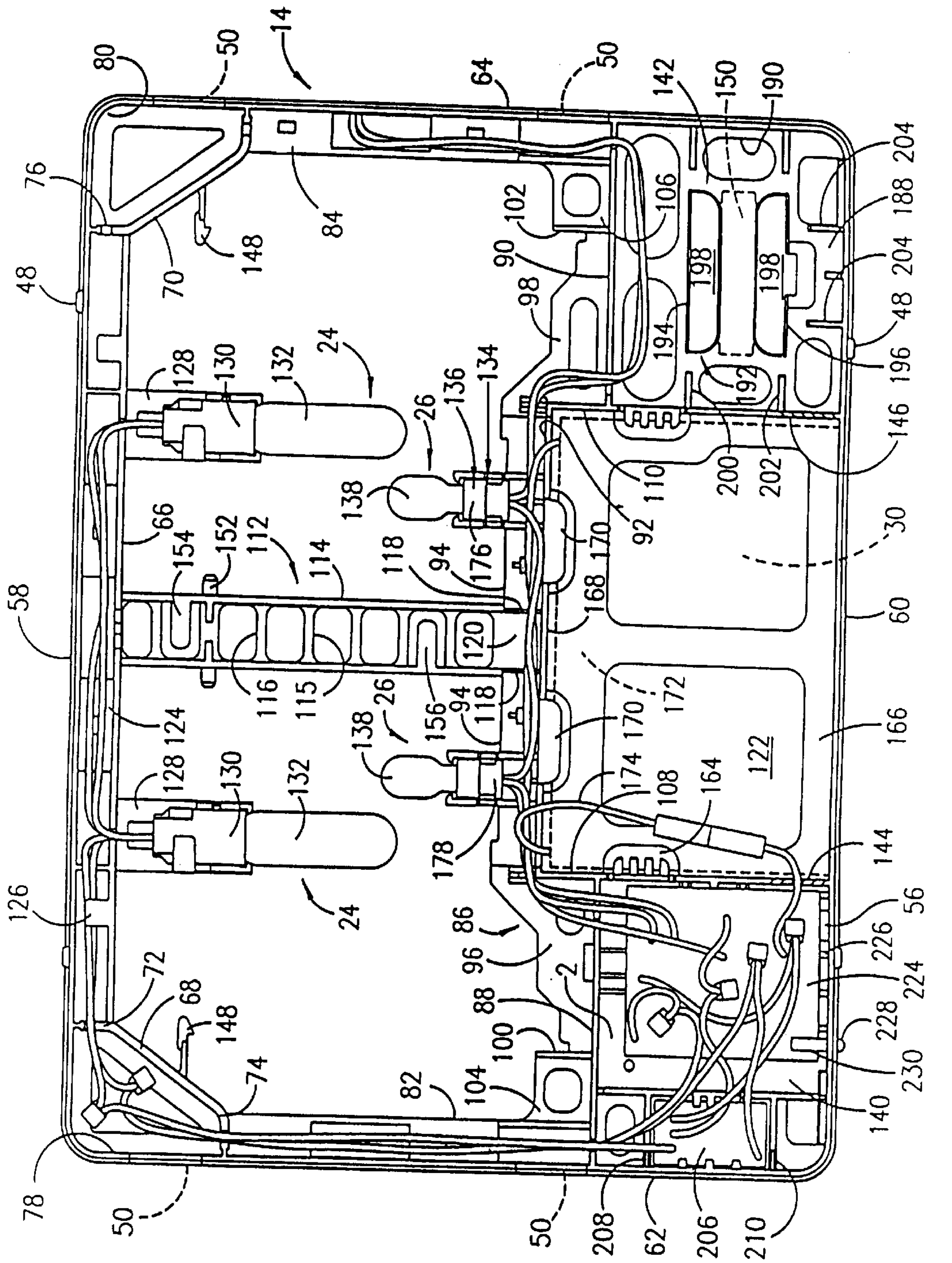
FIG. 9 is a view of the housing of the invention.

As will be described in more detail hereinafter, and with additional reference to FIG. 9, a pair of incandescent lamps 24 are disposed within the interior of the housing 12 and operate on AC line voltage to illuminate the combo fixture 10 during normal, non-emergency situations during which the location of emergency egress paths is to be recognized by those persons using the environmental spaces within which the fixture 10 is mounted. A pair of emergency lamps 26 such as are seen in FIG. 9 are located internally of the housing 12 and powered only during loss of AC line voltage by means of a battery 30 (as seen in FIG. 9 inter alia), appropriate circuitry (not shown in FIGS. 1 and 2) causing DC voltage from the battery 30 to operate the emergency lamps 26 during a power failure such as would occur during emergency situations. The non-emergency lamps 24 thus illuminate the indicia 20 in normal situations with the emergency lamps 26 illuminating the indicia 20 during emergency situations. While the combo fixture 10 intends the indicia 20 to take the form of the word "EXIT" formed in the face plate 16, it is to be understood that other indicia could be formed in the face plate 16 such as is conventional in the art. The use of non-emergency lamps such as the lamps 24 and driven by alternating current from building mains as well as the use of emergency lamps such as the lamps 26 operated on DC battery current in the event of power loss and/or emergency conditions is known in the art and need not be described in greater detail herein. As will be described hereinafter relative to FIG. 13, it is to be seen that a light emitting diode array 28 can be utilized in non-emergency situations as replacement for the lamps 24.

Continuing to refer to FIGS. 1 and 2 as well as to FIGS. 3 through 5 and 8, a canopy 32 is employed to mount the combo fixture 10 to a J-box (not shown) so that the fixture 10 is positively mounted either to the ceiling or to a wall of an environmental space within which the fixture 10 operates. As is seen in FIGS. 17B, C and D, openings 34 are provided in the frame 14 at least centrally of an upper edge of-the housing 12. Openings 34 can similarly be provided on side edges of the housing 12 for end mounting of the fixture 10 such as can occur with the structure of FIGS. 6 and 7, that is, when one of the ends of the fixture 10 is available for end mounting. It is preferred that the combo fixture 10 be mounted either from the top or from the back as will be described in detail hereinafter and as is particularly shown relative to a top mount in FIGS. 1 and 2 inter alia. While various canopy structures can be utilized including a number of canopies which are conventional in the art, it is preferred to use the canopy described in co-pending United States patent application Ser. No. 08/343,775, filed Nov. 22, 1994, now U.S. Pat. No. 5,526,251 by Gary S. Andre, Andrew E. Masters and Stephen P. Smith. and entitled "Emergency Lighting Connections", Ser. No. 08/343,775 now U.S. Pat. No. 5,526,251 being assigned to the assignee of the present application. While the canopy 32 and corresponding structure such as the openings 34 in the frame 14 inter alia which are present in the combo fixture 10 can be identical to that corresponding structure disclosed in co-pending patent application Ser. No. 08/327,487, now U.S. Pat. No. 5,611,163 it is to be understood that the canopy of the co-pending application for patent is only one of a number of canopy structures usable to fasten the combo fixture 10 to a J-box (not shown). In essence, mounting of the canopy 32 or any other canopy to such a J-box (not shown) is conventional in the art and further discussion of same is not believed necessary to an understanding of the present disclosure.

While the structural features of the combo fixture 10 which have been generally referred to hereinabove will be described in greater detail hereinafter, it is necessary at this point to describe certain general concepts which underlie the defined structure as seen in the drawings. Prior art combination exit sign/emergency lighting unit fixtures have usually been formed at least partially of metal especially in situations where the weight of the entire fixture is supported essentially by a housing such as the housing 12 which contains within the interior thereof essentially all structure except for the unit lamp assemblies such as the assemblies 13. In such prior situations, batteries of substantial size have been necessary in order to provide power for the exit sign function as well as for the emergency unit function. Due to the substantial weight of the batteries and of the fixtures themselves, it has not been previously possible to support the weight of a combo fixture 10 when the fixture 10 has been effectively formed of "plastics" that is, polymeric materials, since a structurally all-plastic unit, until the present invention, would warp and bow over time even when formed of the strongest polymeric materials. If formed of plastic materials of lesser strength, a combination fixture usually deforms and is likely to break rather than merely deform. Therefore, the present invention provides a dimensionally stable combo unit 10 which does not warp or bow over time even though effectively formed completely of "plastic", the combo fixture 10 being the first and only combo fixture formed of plastic wherein all batteries and other structural features are effectively contained and/or supported by a single housing such as the housing 12. While the combo fixture 10 could be formed of a material such as sheet metal, it is to be understood that a number of the advantages of the invention would be lost if the combo fixture 10 is so formed. In particular, the combo fixture 10 can be assembled from a relatively small number of individual parts especially since the frame 14 as will be more fully described hereinafter can be molded from a plastic material to produce a single part having a very large number of structural features integrally formed therewith. All structural features of the combo fixture 10 are formed of plastic and are molded. Certain parts such as the lamps 24 and 26 and the battery 30, for example, are not formed of plastic but are items which must be otherwise formed. However, these parts are not structural and have no function in support of the overall weight coupled with maintenance of the integrity of the combo fixture 10 per se. The function of the housing 12 as a single containing unit is further improved by the ability to snap-fit together virtually every combination of parts comprising the combo fixture 10. Formation of the combo fixture 10 substantially from plastic materials facilitates not only the essentially integral nature of the fixture 10 with fewer parts but also facilitates the snap-fitting together of the relatively few parts comprising the fixture 10. The essentially all-plastic single housing 12 is constructed as will be described hereinafter such that fixture weight can be supported without resort to metal structural features such as would be occasioned by battery weight inter alia in a combination exit sign/emergency unit fixture.

The structural strength of the present combo fixture 10 is provided even though the housing 12 is only slightly larger than the housings of most conventional exit signs.

Figure 5:
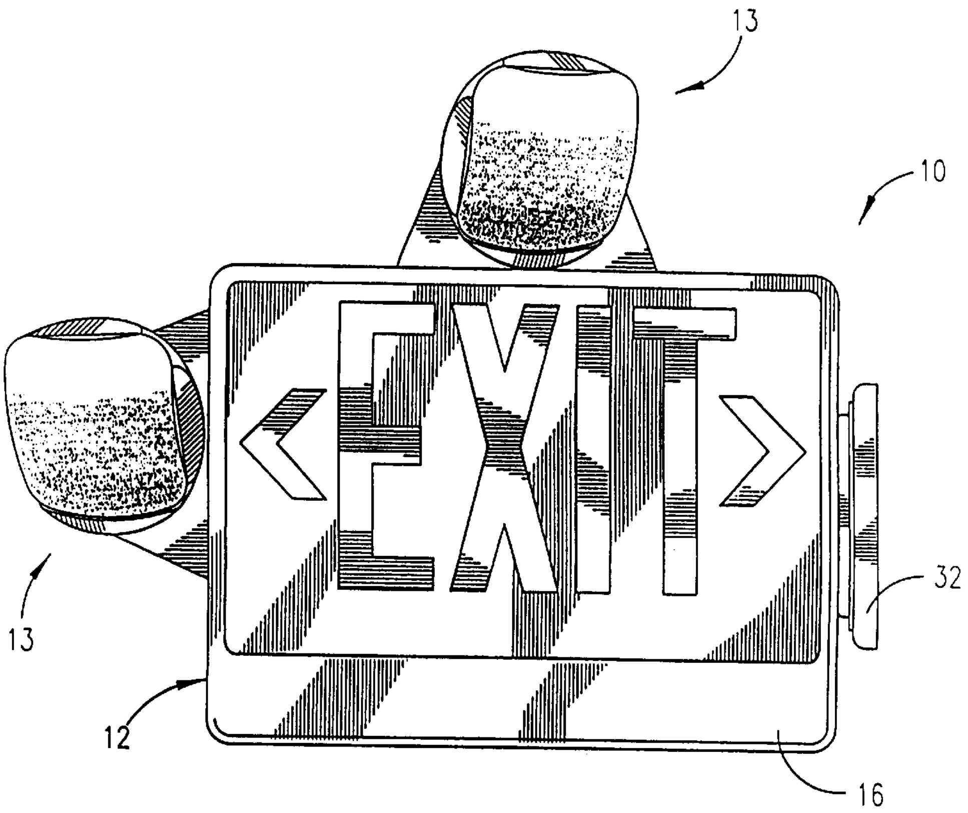
FIG. 5 is a front elevational view of a third embodiment of the invention.
Figure 6:
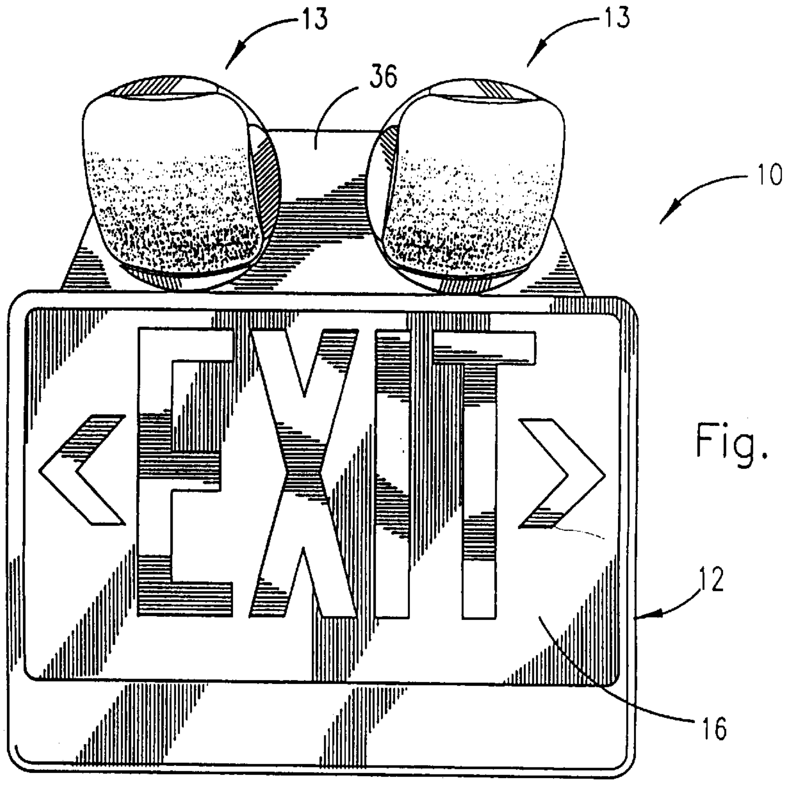
FIG. 6 is a front elevational view of a fourth embodiment of the invention.
Figure 7:
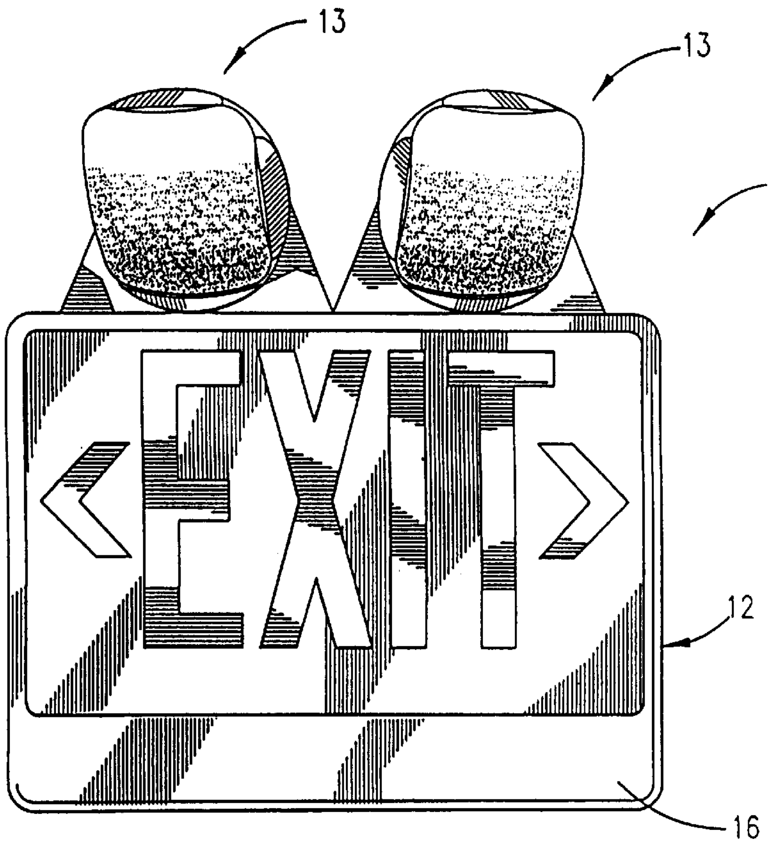
FIG. 7 is a front elevational view of a fifth embodiment of the invention.

A further general feature of the combo fixture 10 is occasioned by the cooperative relationship between the emergency lighting unit lamp assemblies 13 and the frame 14 of the housing 12. The assemblies 13 can be positioned on each end of the housing 12 as is seen in FIGS. 1 and 2. However, the assemblies 13 can be otherwise mounted to the housing 12 such as is seen in FIGS. 5 and 7 by the simple provision of a pattern of slots (not shown in these figures) so that the assemblies 13 can be mounted to one side and to the top as seen in FIG. 5 or with two assemblies on top as seen in FIG. 7. Although not shown in the drawings, slots can be formed in lower surfaces of the housing 12 so that one or more of the assemblies 13 could be mounted along the lower edge of the housing 12. As is seen in FIG. 6, a dual unit lamp assembly 36 is mounted along the top edge of the housing 12 utilizing the same slot pattern as would be used with the structure shown in FIG. 7. The structure preferred for mounting of the assemblies 13 and the assembly 36 will be described in detail hereinafter. Appreciation of the structure of the assemblies 13 and of the assembly 36 is necessary in order to understand the importance of the fact that said assemblies 13 and 36 can be repositioned on the housing 12 or removed entirely to constitute slave and/or remote units for producing lighting at locations distant from the combo fixture 10.

Figure 3:
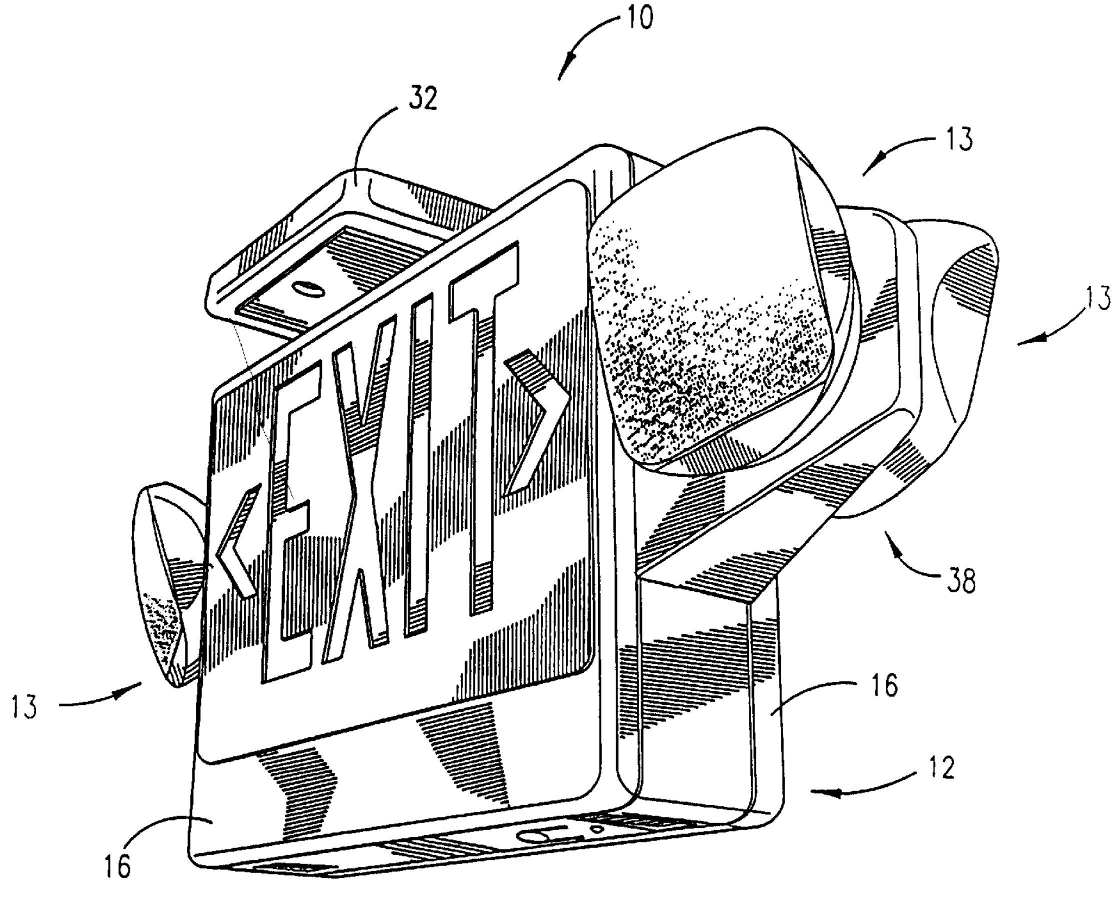
FIG. 3 is a perspective view of a second embodiment of the invention.
Figure 4:
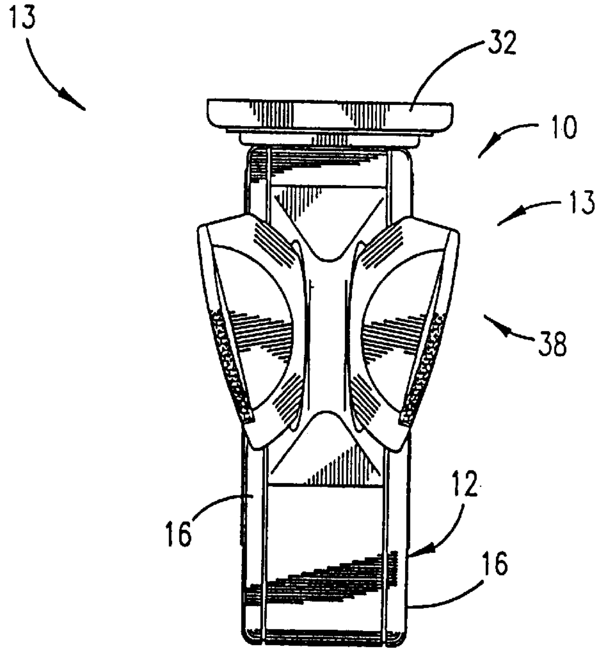
FIG. 4 is a side elevational view of the embodiment of FIG. 3.
Figure 8:
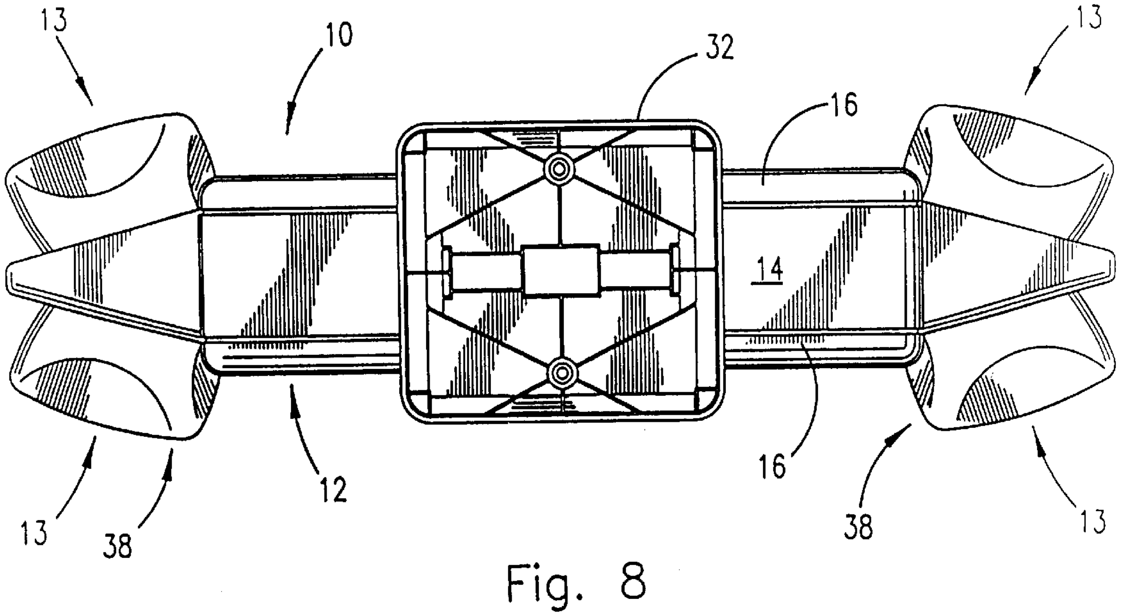
FIG. 8 is a plan view of the embodiment of FIG. 3.

Reference to FIGS. 3, 4 and 8 in particular illustrates a further capability of the invention, double-sided dual unit lamp assemblies 38 being substituted for the assemblies 13 so that the unit emergency lighting function can be provided relative to both faces of the housing 12. Due to the low-profile space-saving nature of the structure of the assemblies 13, it is a simple matter to form the double-sided dual unit lamp assembly 38 without substantial modification, this structure being best understood by subsequent description of the assemblies 13 inter alia.

Figure 14:
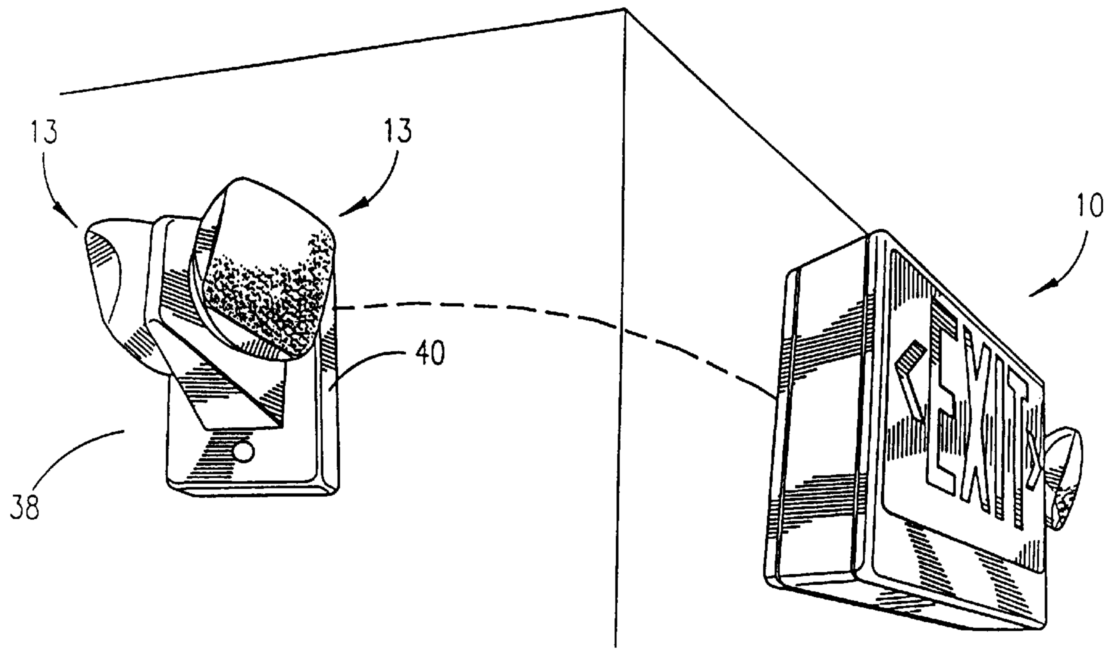
FIG. 14 is a perspective view of the invention illustrating remote location of a slave fixture according to the invention.
Figure 16:
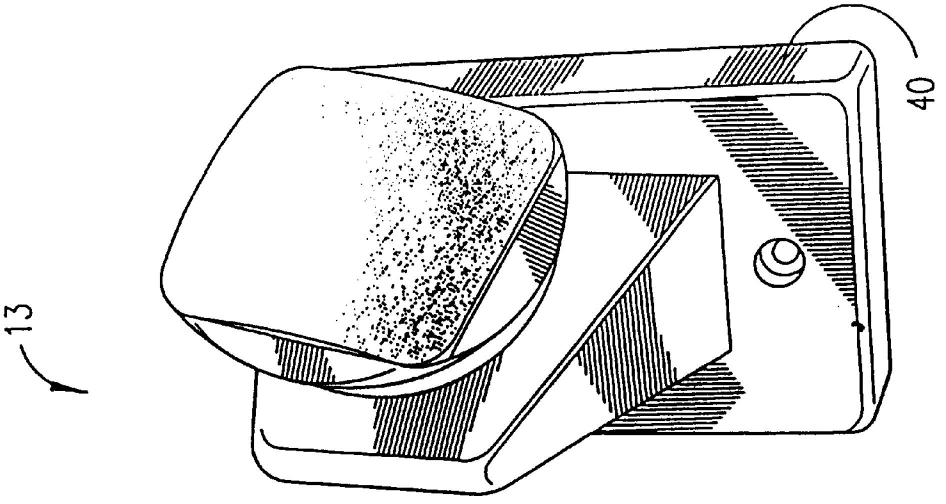
FIG. 16 is a perspective view illustrating the structure of FIG. 15 in an assembled relationship.
Figure 15:
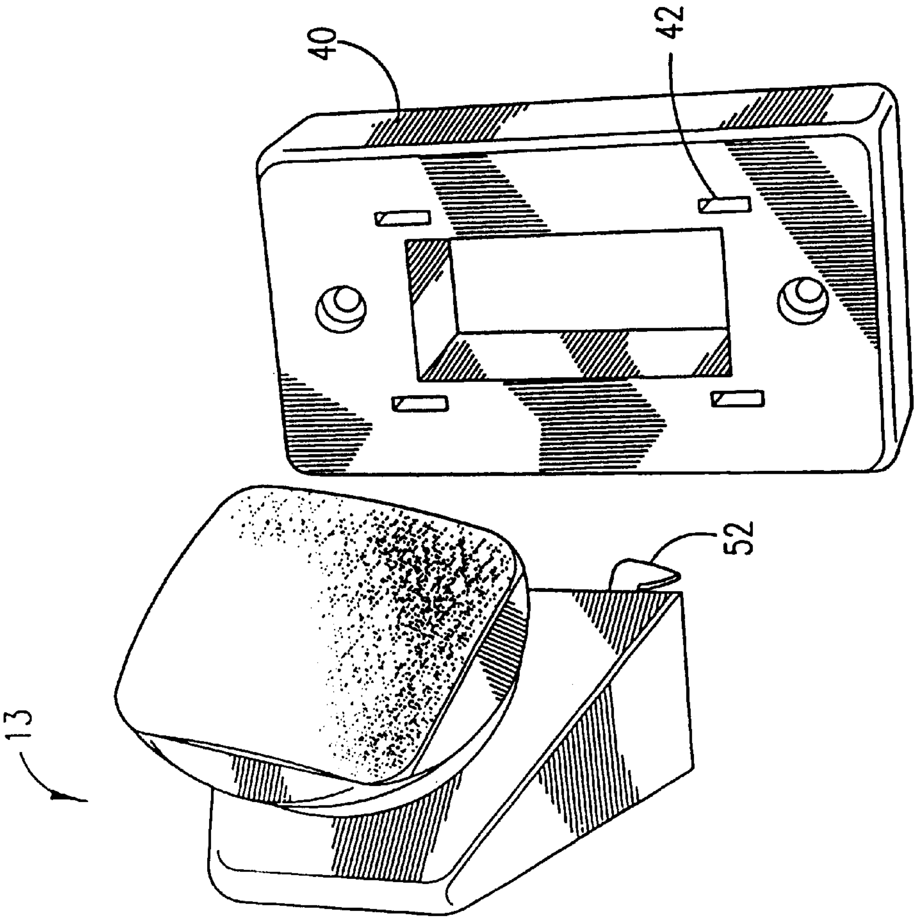
FIG. 15 is a perspective view of a fixture having a portion of the combination fixture forming a part thereof.

As is best seen in FIGS. 14, 15 and 16, either of the assemblies 13 and 38 can be removed from the housing 12 and attached to a mounting base 40 and driven as a remote slave unit from power provided by the battery 30 within the housing 12. optionally, a battery (not shown) within the mounting base 40 (or made a part of the assembly 13 or the assembly 38) could provide power for a totally separate fixture as shown in FIGS. 14, 15 and 16. The dual unit lamp assembly 36 of FIG. 6 as previously described could also be removed from the housing 12 of FIG. 6 and provided with a mounting base (not shown) of a greater lengthwise dimension than said base 40 and provided with a slot pattern capable of mounting said assembly 36 for use as a remote slave unit or as a remote, self-contained unit. FIG. 15 illustrates the pattern of slots 42 useful for mounting of the assemblies 13 and 38 to the mounting base 40 in a manner such as will be described in detail hereinafter.

Due to the complexity of the structural details of the combo fixture 10 and further in view of the independent nature of at least certain of the sub-systems comprising the fixture 10, the remaining disclosure is organized by sub-headings which will allow for more ready access to information concerning the various structural features and sub-systems of said fixture 10.

Housing Frame Construction

As previously described, the housing 12 essentially comprises a container formed by the frame 14, the face plate 16 and the back plate 18. In those installations wherein both faces of the housing are visible and are intended to provide egress information, the back plate 18 is replaced by a plate which would be essentially identical to the face plate 16. The back plate 18 is used to enclose the housing 12 in those situations wherein the visible indicia 20 is only required on the "front" of the housing 12 and is provided by the face plate 16. The back plate 18 is particularly used in situations wherein the combo fixture 10 is installed directly against a J-box (not shown) mounted flushly in a vertical wall (not shown), the back plate 18 being then mounted directly to such a J-box (not shown) through use of conventional connections with the back plate 18 connecting to the frame 14 as will be described hereinafter.

Figure 17C:
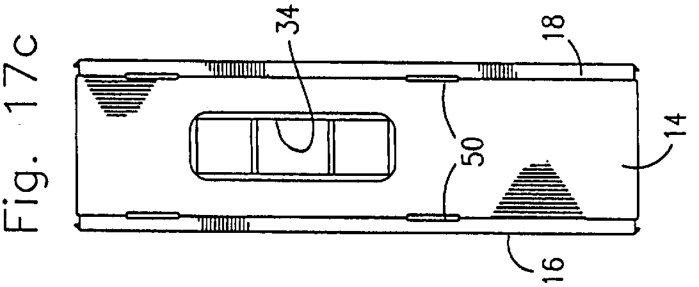
Figure 17A:
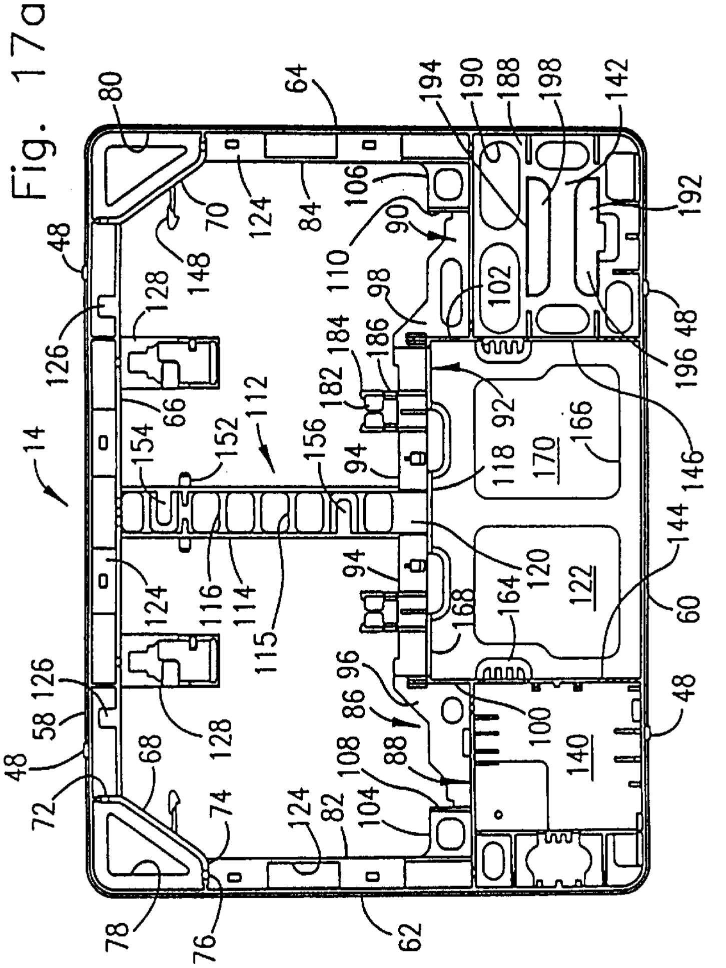
Figure 17B:
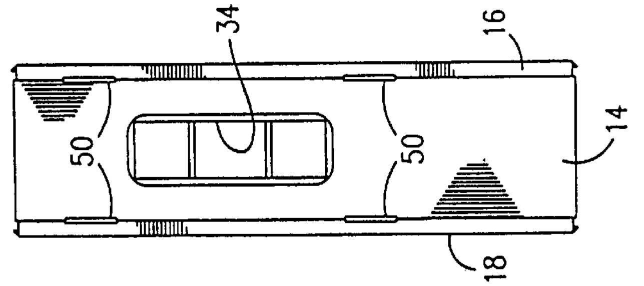
Figure 18:
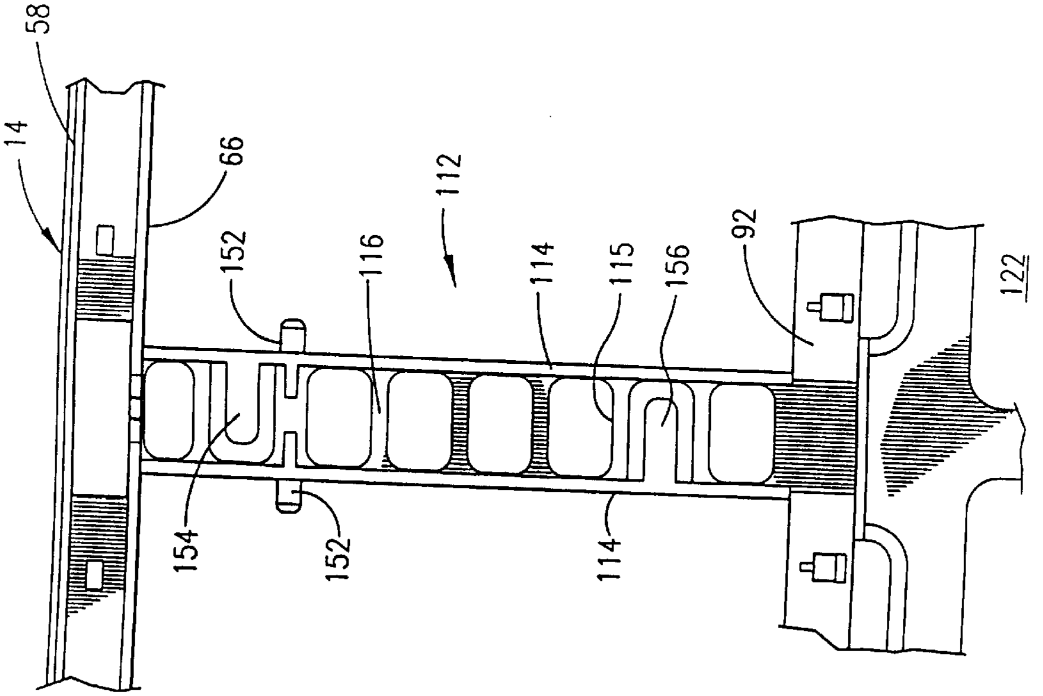
FIG. 18 is a view of the ladder structure.

Referring now to FIGS. 17A through 17E, inter alia, the face plate 16 and the back plate 18 each connect to the frame 14 by means of four snap-fitting connections 44 which comprise two spaced slots 46 formed along top and bottom edges of each of the plates 16, 18, each plate 16, 18 thus having a total of four slots 46 intended to facilitate connection of the plates 16, 18 to the frame 14. The frame 14 is provided with a total of eight rounting tabs 48 with two each of said tabs 48 being disposed along each side of both of the top and bottom edges of the frame 14, the tabs 48 being positioned to be received one each within each of the slots 46 formed in the plate 16, 18 so that the plate 16, 18 can be readily and rapidly assembled to the frame 14 to enclose the housing 12 as is best seen in FIGS. 17D and 17E.

Essentially all of the features of the combo fixture 10, with the exception of the lamp assemblies 13 or similar structure, are contained within the housing 12 and are supported by the frame 14. The lamp assemblies 13 are in essence also carried by the housing 12 but on exterior portions thereof. The weight of the combo fixture 10 due both to that structure located interiorly and exteriorly of said housing 12 is effectively supported in tension rather than by cantilever as is conventional in the prior art. The housing 12 and particularly the frame 14 is thus engineered in a manner particularly intended to support the weight of the fixture 10 in tension, thereby allowing the formation of the fixture 10 and particularly of the frame 14 essentially entirely of a "plastic" material such as polycarbonate/ABS. This ability to form the fixture 10 and particularly the frame 14 from plastic material then further allows the frame 14 to be molded integrally to thereby reduce the number of parts which must be formed and then assembled to produce the combo fixture 10. The construction and structure of the frame 14 as a single molded piece still further allows the carriage of heavy parts such as the battery 30 inter alia internally of the housing 12 and within the single housing 12. Formation of the combo fixture 10 and especially the integral frame 14 from a plastic material further facilitates the snap-together construction of the combo fixture 10, virtually all parts of the fixture 10 being snap-fitted together thereby yielding a total structure which can be readily and rapidly assembled.

The advantages thus enumerated which accrue from the structure of the frame 14 inter alia can be best appreciated by consideration of the frame 14 shown in FIGS. 17A inter alia. FIG. 17A illustrates the one-piece frame 14 without mounting of other portions of the fixture 10 thereto. FIGS. 17B through 17E illustrate the frame 14 with the plates 16, 18 mounted thereto as illustration of the enclosed housing 12. Prior to a discussion of the interior structure of the frame 14, those features best seen exteriorly. of the fixture 10 will be described.

The frame 14 is seen to be provided on each end with a pattern of four slots 50 which are of a size and which are spaced apart in a rectangular form in the manner of the slots 42 discussed above relative to the mounting of one of the lamp assemblies 13 to the mounting base 40 to form a remote fixture. The top of the frame 14 is provided with two of the patterns of four slots 50. The slots 50 are formed in the frame 14; however, portions of the periphery of the plates 16, 18 face the slots 50 on assembly of said plates 16, 18 to the frame 14 and to render less conspicuous the slots 50 into which torsion snaps 52 are inserted to mount the lamp assemblies 13 (as well as the lamp assembly 36 to the top of the housing 12) to the housing 12. While not shown in FIG. 17E, a pattern of the slots 50 could be formed along the bottom of the housing 12 if mounting of one or more of the lamp assemblies 13 to the bottom of the housing 12 is desired. Mounting of one or more of the lamp assemblies 13 to the bottom of the housing 12 would be advantageous in situations where flexibility of operation is desirable within the space within which the combo fixture 10 is utilized. The frame 14 is also seen in FIG. 17E to be provided with fixed louver vent openings 54 to facilitate ventilation of the housing 12. A flapper switch 56 is provided in the bottom of frame 14 in association with test circuitry (not shown in FIG.

17E) to allow testing of the electrical systems of the combo fixture 10 as will be described in detail hereinafter.

The canopy 13 referred to hereinabove can be used to mount the combo fixture 10 as will be described hereinafter and as is described in co-pending U.S. patent application Ser. No. 08/343,775, filed Nov. 22, 1994 as aforesaid, the disclosure of this application for patent being incorporated hereinto by reference.

Considering now the construction of the frame 14, reference is particularly made to FIG. 17A wherein upper and lower walls 58 and 60 are integrally formed with side walls 62 and 64, said walls defining the periphery of the frame 14 and thus of the housing 12. An upper interior wall 66 extends parallel to the upper wall 58 and terminates at respective ends in corner plates 68 and 70, the plates 68 and 70 each having side-mounted upper and lower angled elements 72 and 74 which have open-ended slots 76 which are capable of receiving wiring (not shown in FIG. 17A) for holding said wiring in place within the interior of the housing 12. The plates 68 and 70 respectively define spaces 78, 80 within which wiring, wire nuts, plugs and the like (not shown) can be disposed. The plates 68, 70 along with the angled elements 72 and 74 provide strengthening of the frame 14 even in the absence of the interior wall 66. Coupling of the interior wall 66 with the plates 68, 70 and angled elements 72, 74, respectively, and further with interior side walls 82 and 84 provides a high degree of stiffness and rigidity to the frame 14. The side walls 82 and 84 connect at respective ends to a lateral platform 86 comprised of horizontally disposed side tables 88 and 90 which connect to a central mounting angle 92 which is surmounted by central support webs 94 and 96 which further connect to side webs 96 and 98 respectively through upper vertical walls 100 and 102. The side webs 96 and 98 respectively connect to end webs 104 and 106 through triangular normally related supports 108 and 110, the end webs 104 and 106 respectively connecting to lowermost ends of the side walls 82 and 84, thereby providing a continual interior structural web which is centrally bisected by a vertical ladder 112 formed of spaced vertical stiles 114 having horizontal rungs 116 regularly disposed along the stiles 114. Openings between the rungs can be utilized for management of wiring within the interior of the housing 12 and particularly relative to options available with the combo fixture 10. At the lower end of the ladder 112, the support webs 94 bend 90° to form ladder connection walls 118 which join to respective ends of the stiles 114. A bottom ladder plate 120 completes connection of the stiles 114, the plate 120, the lower ends of the stiles 114, the walls 118, and the support webs 94 by connecting to and being integrally formed with top portions of the angle 92. The top end of the ladder 112 joins integrally with the upper interior wall 66 and the upper wall 58, thereby providing a tensioned support structure internally of the housing 12 which acts to support the weight of the combo fixture 10 substantially in tension rather than cantilevered as in prior exit signs and sign-like fixtures. The weight of the battery 30 located within battery compartment 122 is particularly seen to be mounted in tension by the ladder 112 inter alia due also in part to the placement of the battery 30 (and any other battery) centrally of the interior of the housing 12 and along the lower portion thereof.

Interior canopy mounting housing 124 are respectively disposed centrally between the upper wall 58 and the interior wall 66 and between the side walls 62, 64 and the interior side walls 82, 84. wiring guide clips 126 are disposed on either side of the uppermost mounting housing 124 to facilitate a desired location of wiring (not shown in FIG. 17A) along upper portions of the housing 12. Substantially conventional mounting elements 128 each releasably hold lamp bases 130 and associated non-emergency AC bulbs 132, the mounting elements 128 also being integrally formed with the frame 14. Mounting bases 134 capable of holding lampsockets 136 and associated DC emergency bulbs 138 are integrally formed on respective portions of the support webs 94, the location of the bulbs 138 acting to produce light at locations above the battery compartment 122 so that light can be directed about the upper portions of the battery 30 (or other battery) to reduce the shadowing effect of the battery 30 within the indicia 20 as will be described in greater detail hereinafter.

An electronics compartment 140 is located below the side table 88 and laterally of the battery compartment 122 while an options compartment 142 is located below the side table 90 and to the other side of the battery compartment 122. The respective compartments 140 and 142 are separated from the battery compartment 122 by means of respective vertical walls 144 and 146. The various structures integrally formed with the frame 14 and contained within the compartments 122, 140 and 142 will be described in detail hereinafter. Clips 148 disposed on opposite sides of the interior of the housing 12 extend respectively from the corner plates 68, 70 and are adapted to hold respective LED arrays 28 (see FIG. 13) within the interior of the housing 12. The structures described above and which can be seen in FIG. 17A are integrally formed with the frame 14 by molding of a plastic material. In essence, the entire structure seen in FIG. 17A is a single unitary structure comprising the frame 14 and molded with said frame 14 are openings provided as a means for reducing the amount of plastic necessary for molding thereof.

Tension Support and Weight Management Arrangements

As described above, the ladder 112 is provided as an integral portion of the frame 14 to provide support in tension for the entirety of the combo fixture 10 and particularly for the battery 30 held within the battery compartment 122 (or for any other battery held within the battery compartment 122). The ladder 112 is advantageously located within the interior of the housing 12 to provide tension support for the weight of the fixture 10 as well as for battery weight. It should be understood, however, that the ladder 112 could take other forms, such as a solid vertical member whether or not connected permanently to the angle 92 at the lower end thereof or to the interior wall 66 and the wall 58. The ladder 112 is formed of the stiles 114 and of the rungs 116 in order to provide openings 115 between the rungs through which wiring can be strung for management of the location of wiring within the interior of the housing 12. The openings 115 are also provided for reduction of material and for facilitating light movement within the interior of the housing 12. When the fixture 10 is back mounted, the openings 115 also serve to provide access for routing wiring (not shown) within the interior of the housing 12 as will be better appreciated hereinafter. The battery 30 is located centrally of the lower portion of the housing 12 so as to advantageously allow the ladder 112 to act in tension to support the weight of the battery 30. While the battery 30 is intended to be a conventional rechargeable lead-acid battery, it is possible to utilize lead-acid batteries of greater capacity with weights up to approximately 4 pounds when a greater amount of power is necessary for providing for a greater period of time and for that additional power necessary to operate slave units remote from the fixture 10 such as has been described above. It is also possible to utilize nickel-cadmium batteries of smaller size, the smaller Ni—Cd battery (not shown) being mounted within the interior of the battery compartment 122, the details of mounting of the Ni—Cd battery within the compartment 122 not being described herein. As aforesaid, the ladder 112 is provided with horizontal elongated tab elements 154 and 156, the elements 154 and 156 being preferably used for management of wiring (not shown) associated with the fire alarm interface 150. The ladder 112 is further provided with peg elements 152 disposed one each on either side of the ladder 112 and extending from each of the stiles 114 near the uppermost end of the ladder 112, the peg elements 152 acting to receive snap elements 158 and 160 located on the interior wall of the back plate 18 as will be described hereinafter, the snap elements 158 and 160 cooperating respectively with the peg elements 152 to facilitate mounting of the frame 14 to the back plate 18 when the back plate 18 is mounted directly to a J-box (not shown) mounted flushly in a wall surface.

Battery Mounting Arrangements

As aforesaid, the battery compartment 122 is configured to house the battery 30 as well as a larger battery 162. It is to be understood, however, that only one of the batteries 30 and 162 would be utilized at any one given time. As can be seen in FIGS. 17A inter alia, the battery compartment 122 is formed centrally of the lower portion of the combo fixture 10 and is provided with snap fingers 164 on inner surfaces of the walls 144 and 146, the snap fingers 164 extending from said wall surfaces at a lesser height forwardly of the compartment 122 and terminating at a greater height interiorly of the compartment 122 such that the battery 30 can slide over the snap fingers 164 and into a position of essentially against a back wall 166 of the battery compartment 122. It is to be seen that the battery compartment 122 is provided with a top wall 168 having tabs 170 extending downwardly therefrom at the outermost end of said top wall 168 so that the larger battery 162 can be slipped into place under the tabs 170 and into a position abutting the back wall 166 and held by the tabs 170 in order to hold the larger battery 162 in place. Accordingly, the battery compartment 122 is provided with structure capable of holding batteries of at least two different sizes within said compartment 122 by snap-fitting arrangements.

When placed within the battery compartment 122 as is necessary for operation, the batteries 30 and 162 are of a sufficient height as to extend into the lower part of the indicia formed in the face plate 16. Due to this extension of the battery 30 and the battery 162 into the legend, it is possible that a shadowing effect is caused such that lower portions of the indicia are darker than upper portions of the indicia. The location of the lamps 24 within the interior of the housing 12 during normal operation and the location of the lamps 26 within the interior of the housing 12 during emergency operation provides light within the interior of the housing 12 which is reflected within said housing interior. This light is controlled in part by means of a reflective cover 172 attached to the top of the battery 30 (or the battery 162) with the lower edge of the reflective cover 172 extending downwardly to at least the level of the side tables 88 and 90 such that light is reflected outwardly of the lower portions of the indicia 20 on the face plate 16 to locally increase the amount of light passing through said indicia 20 at lower portions thereof. Provision of the reflective cover 172 thus acts to reduce the effect of the otherwise dark form of the battery 30 or the battery 162 so that the shadowing effect does not detract from the appearance and function of the indicia 20. Optionally, at least the upper portion of the batteries 30, 162 could be painted with a white paint or coated with a reflective material in order to provide a function similar to the function of the reflective cover 172. The reflective cover 172 can also be utilized as a pull tab for removal of the battery 30, 162 from the battery compartment 122. The ability to allow the upper portion of the battery 30, 162 to extend into the "legend" or indicia 20, allows the height of the housing 12 to be reduced so that the combo fixture 10 is more compact and exhibits a relatively lower profile.

It is to be seen that wiring extends from the electronics compartment 140 to the options compartment 142 as is seen in FIG. 9 , this wiring 174 is caused to be slack in front of the battery compartment 122 so that insertion of one of the batteries 30, 162 into the battery compartment 122 does not engage the wiring 174 and pull said wiring into the battery compartment 122.

Emergency DC Lamp Mounting

Figure 21B:
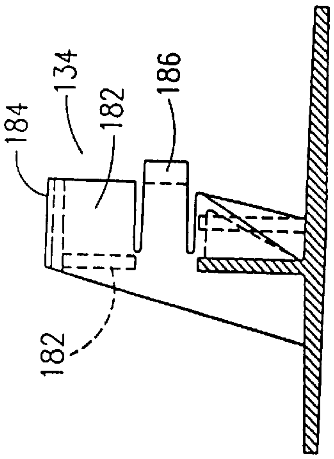
FIGS. 21A and 21B are elevational views of a DC lamp mounting arrangement.
Figure 21A:
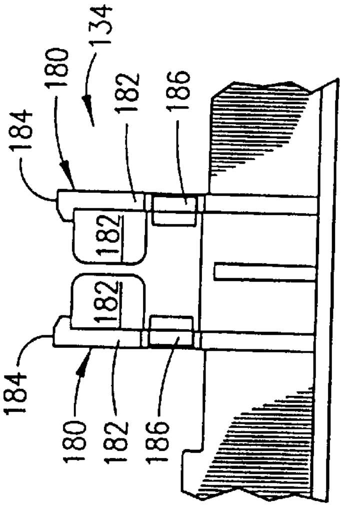
Figure 19B:
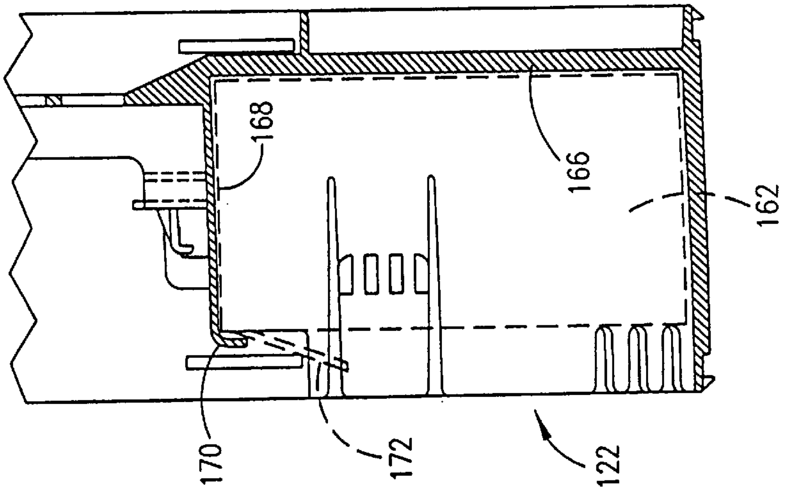
FIGS. 19A and 19B are detailed views of the battery compartment having a relatively small lead-acid battery mounted therein.
Figure 19A:
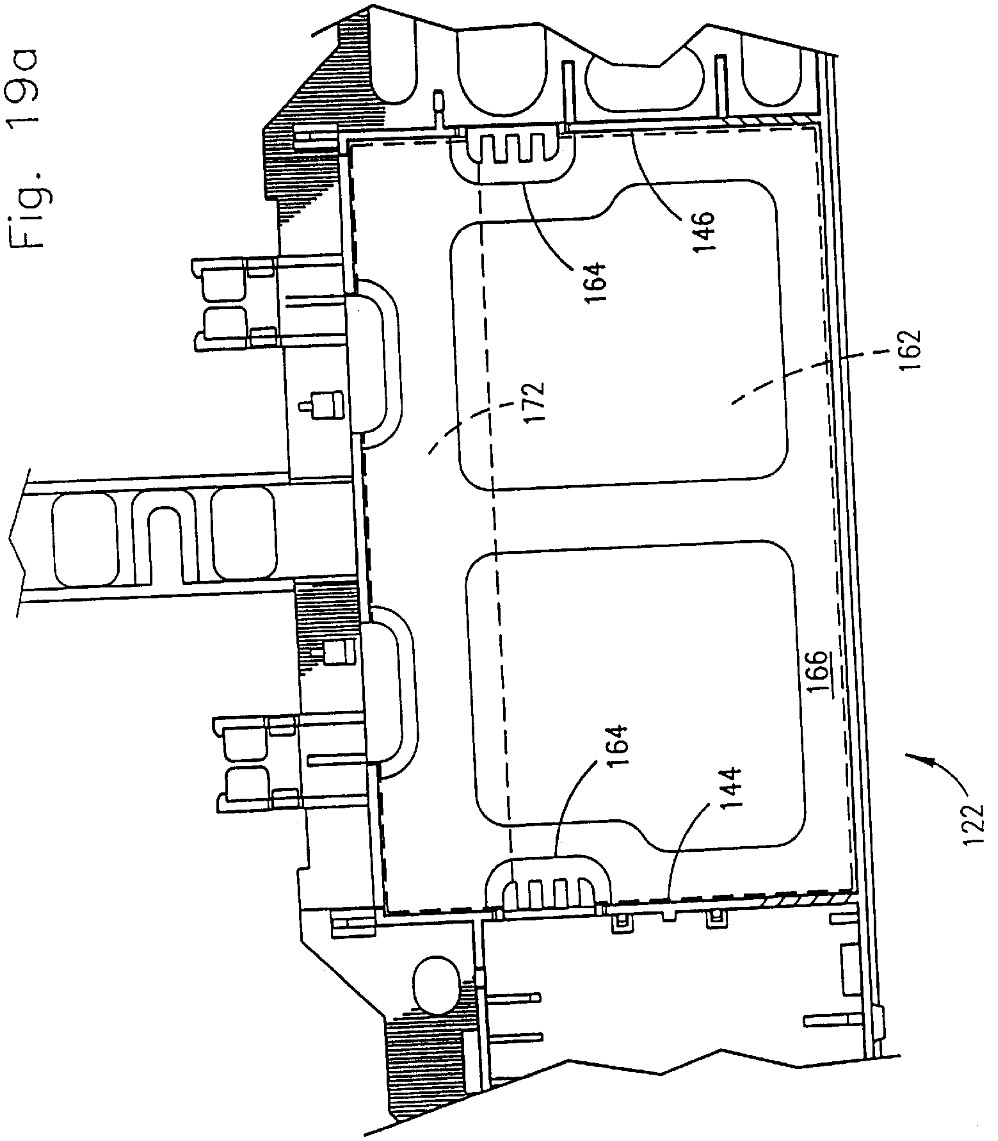
Figure 20B:
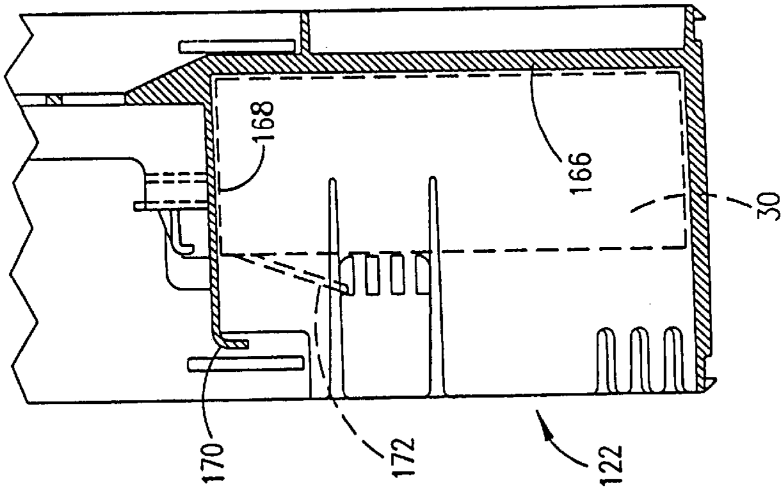
FIGS. 20A and 20B are detailed view of the battery compartment having a relatively larger lead-acid battery mounted therein.
Figure 20A:
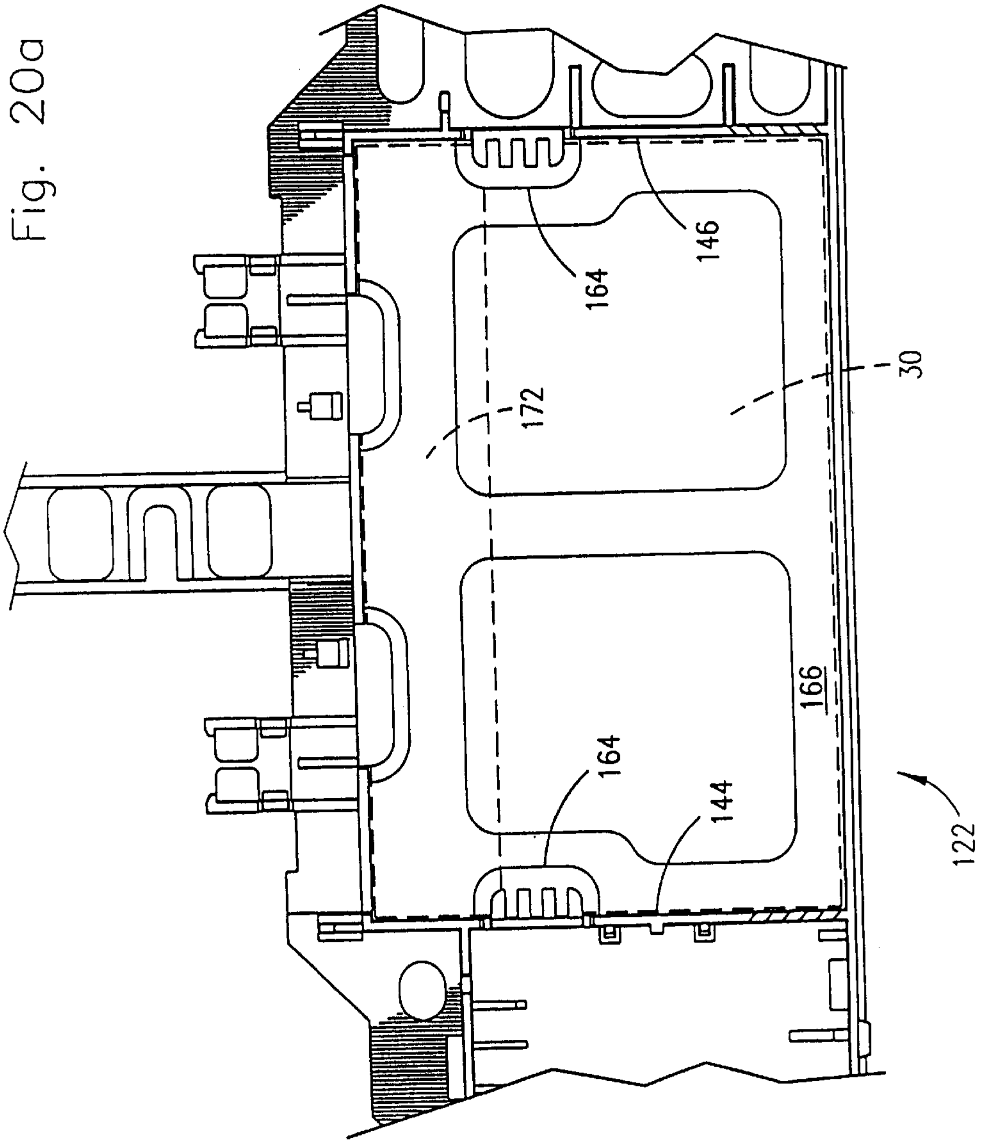

Referring now to FIGS. 21A and 21B, as well as to FIGS. 17A inter alia, one of the mounting bases 134 intended for mounting one of the DC bulbs 138 is now described, a description of one of the DC emergency lamps 26 sufficing for a description of both. The bulb 138 is snapped into the lamp socket 136 to be structurally held thereby and to electrically connect with the lamp socket 136 to power provided in an emergency situation by the battery 30, 162 inter alia. The lamp socket 136 is formed of a rectangular collar 176 open at one end to receive the bulb 138, electrical contacts (not shown) being located within the interior of the collar 176. The collar 176 terminates at the end opposite the bulb 138 in a reduced lower base portion, the lamp socket 136 snap-fitting into one of the mounting bases 134. The lamp base 134 is formed of two basic upper elements 180 each having walls 182 which are perpendicular to each other, rear walls 182 extending toward each other but not contacting at the rear of the base 134. Snap tabs 184 extend from the facing walls 182 toward each other at the upper end of the base 134, the heights of the walls 182 being essentially equal to the height of the collar 176. A pair of lateral snaps 186 extend from the rear of the base 134 below the walls 182 and receive the lower base portion 178 therebetween when the lamp socket 136 is snap-fitted into the mounting base 134. The collar 176 of the lamp socket 136 is partially enclosed by the walls 182 with the sanp tabs 184 abutting against upper edges of the collar 176 to prevent dislodgement of said socket 136 in an upward direction. The discontinuity provided by the lack of contact between the rear walls 182 thereby allows upper portions of the mounting base 134 to expand on insertion of the lamp socket 136 thereinto. Snap mounting of the lamp socket 136 to the mounting base 134 therefore occurs. The lateral snaps 186 prevent dislodgement of the lamp socket 136 forwardly of the mounting base 134, the snaps 186 fitting against the reduced lower base portion 178 so that the lamp socket 136 is positively retained within the mounting base 134.

The mounting of the DC emergency lamps 26 can thus be accomplished both rapidly and easily and within a minimum of parts not integrally formed with the frame 14.

Housing Details

Figure 23:
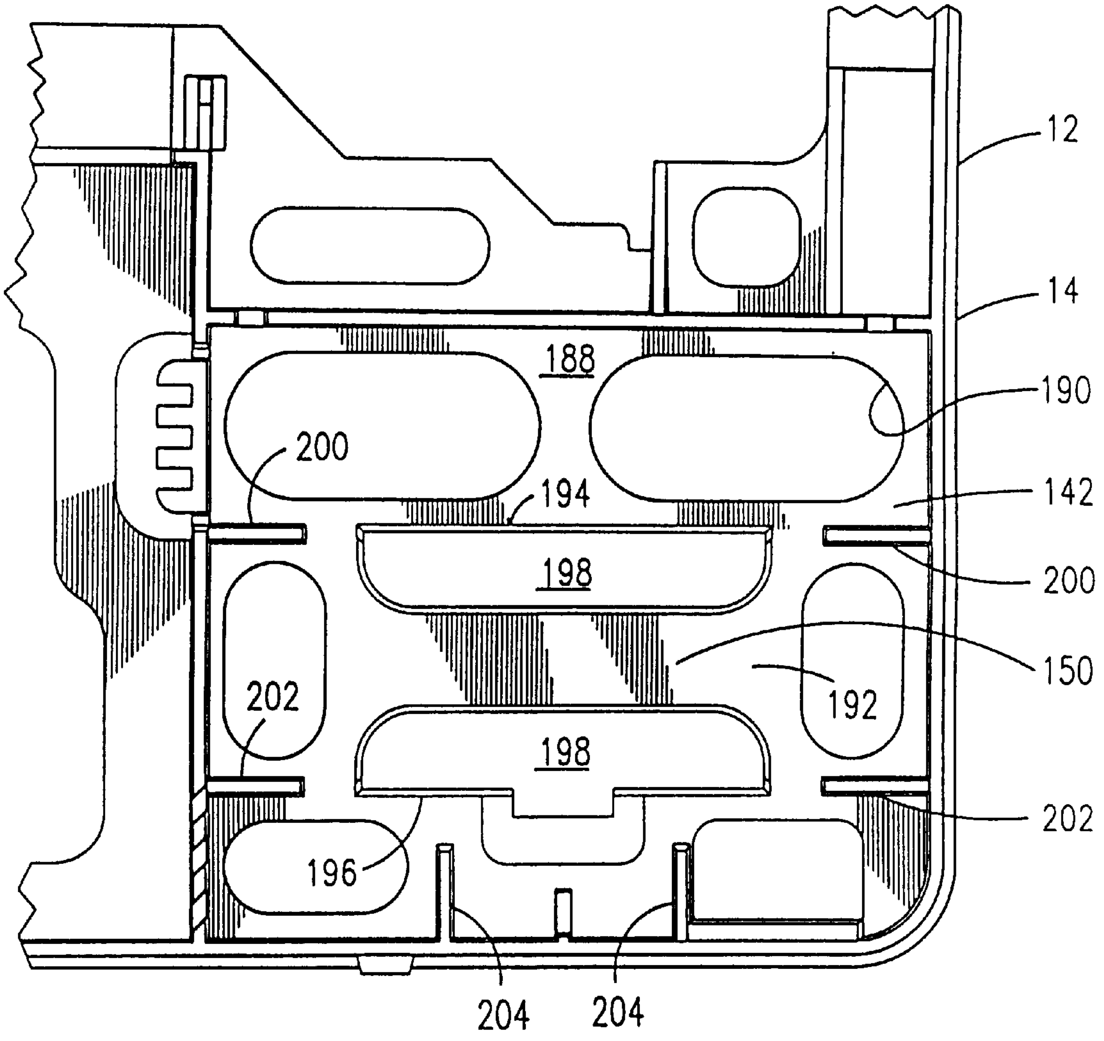
FIG. 23 is a detailed view of an option storage compartment formed in the housing.

As seen particularly in FIG. 23, the options compartment 142 is further defined by back wall 188 which has a plurality of openings 190 formed therein to reduce the quantity of plastic material necessary for formation of the frame 14 and to facilitate ventilation of the housing 12. A variable printed circuit board capturing assembly is seen to be disposed centrally of the compartment 142 at 192 to comprise spaced apart upper and lower plates 194 and 196 with each plate having an inwardly extending lip 198 formed along respective outer edges of the plates 194, 196. The plates 194, 196 are attached along inner edges thereof to the back wall 168 and have the capability of springing together when separated from each other by pressure. A printed circuit board bearing an option such as a fire alarm interface option can be mounted between the plates 194, 196 and held by the spring function existing between said plates 194, 196. The lips 198 further act to hold the printed circuit option board between the plates 194, 196. The printed circuit board is thus mounted in a manner to prevent damage thereto.

Pairs of horizontal surfaces 200 and 202 mount respectively at lower portions of the compartment 142 and at upper portions thereof to form small interior spaces within the compartment 142 for placement of other options such as buzzers and the like. A pair of vertical stem walls 204 mounted in spaced relation to each other and under the lower plate 196 also act to form a space capable of storing an option board or a shrink-wrap option or the like.

Figure 22A:
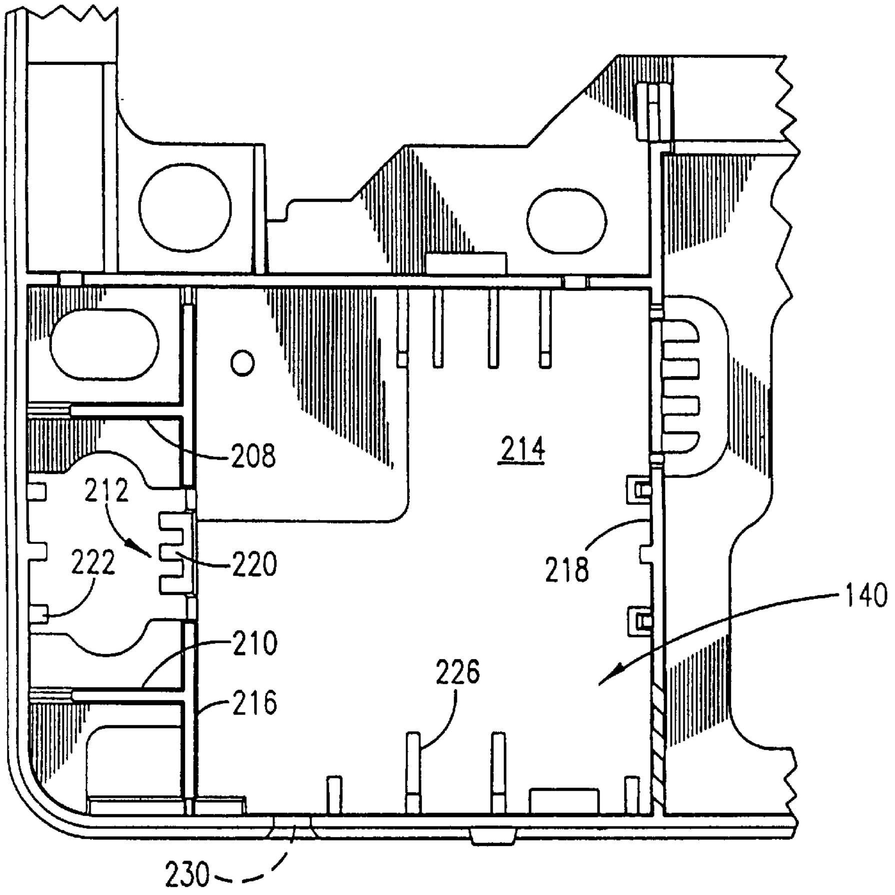
FIGS. 22A and 22B are detailed views of the electrical compartment of the housing.
Figure 22B:
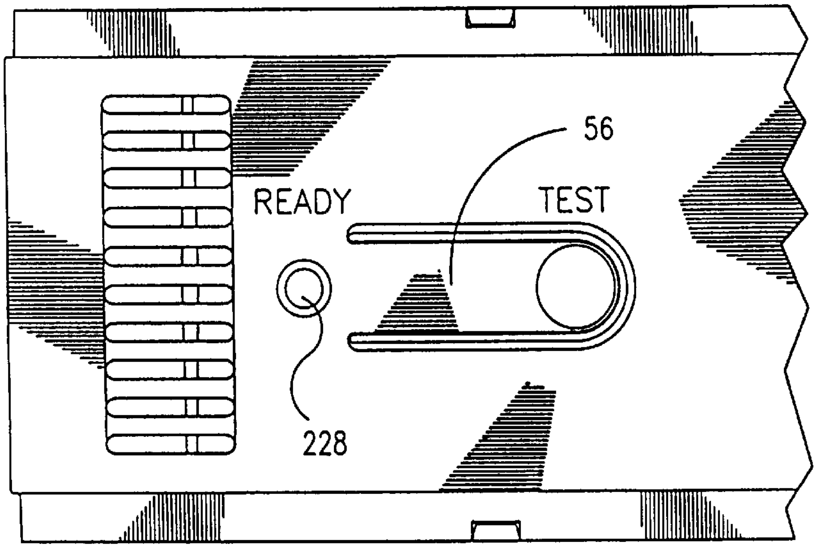

Referring now to FIG. 22, inter alia, the electronics compartment 140 is seen to be provided with a space for snap-mounting of a capacitor 206 therewithin, upper and lower housing walls 208 and 210 extending interiorly of the compartment 140 to form a housing space for the capacitor 206. A flexible snap element 212 mounted to back wall 214 and formed in a slot between side walls 216 and 218 which are also mounted to the back wall 214. The snap element 212 is provided with fingers 220 which abut the capacitor 206 and in combination with fixed snap tabs 222 formed on interior wall surfaces of the frame 14 act to positively hold the capacitor 206 within the compartment 140. A charger board 224 is snap-fitted within the compartment 140 by tabs 226, the board 224 having an LED indicator 228 extending therefrom through an aperture 230 formed in the frame 14, the aperture 230 being best seen in FIG. 17E. The flapper switch 56 seen in FIG. 17A is seen in FIG. 22 to engage a test circuit seen as a block diagram in FIG. 28. The electronics compartment 140 is covered by means of a shaped cover 234 formed preferably of a fiberboard material known as fish paper. The cover 234 form fits over the opening in the compartment 140 to prevent accidental intrusion into the compartment 140.

Diffusion Panel Mounting Arrangement

Figure 29:
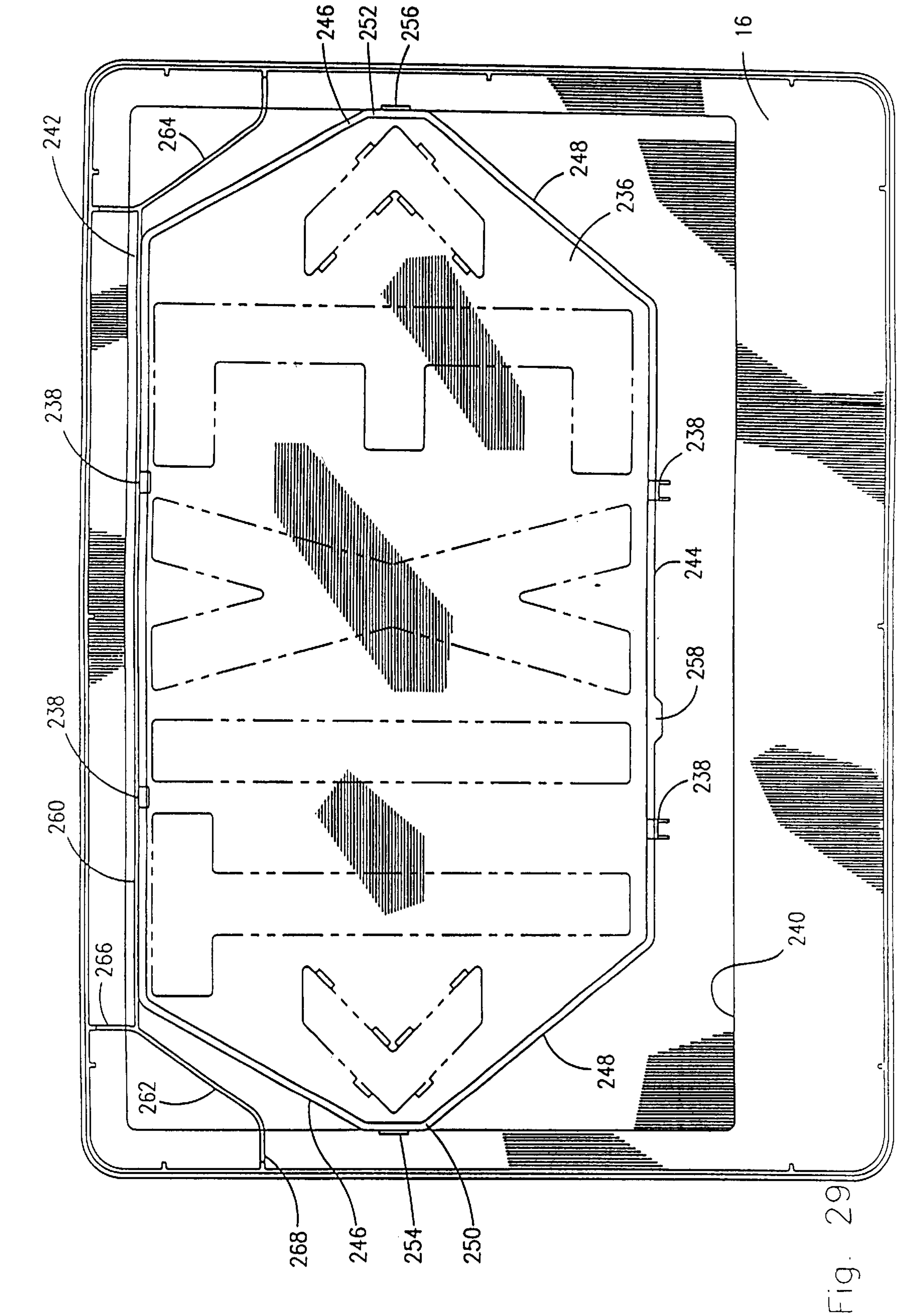
FIG. 29 is a view of a front plate and diffusion panel arrangement of the invention.

Referring now to FIG. 29, the face plate 16 is seen with diffusion panel 236 in an assembly view illustrating the manner by which the panel 236 is mounted to inner walls of the face plate 16. As is seen in FIG. 1 inter alia, portions of the diffusion panel 236 are seen through the indicia 20 formed in the face plate 16. The diffusion panel 236 is formed as a filter or from colored material so that a desired color such as red or green is seen through the indicia 20. The diffusion panel 236 is held to the face plate 16 by means of spaced pairs of snaps 238 located on opposite sides of the indicia 20, the pairs of snaps 238 being spaced apart a distance equal to the width of the panel 236 at the locations of the snaps 238. The panel 236 is formed with a tab 258 located on lower edge 244, the tab 258 allowing the panel to only fit within rectangular recess 240 in one orientation such that the appropriate face of the panel 236 faces outwardly and is disposed immediately behind the indicia 20. The panel 236 also has an upper edge 242 with angled side edges 246 and 248 which terminate in opposing flat edges 250 and 252, the flat edges 250 and 252 respectively fitting between raised tabs 254 and 256. The tabs 254 and 256 prevent lateral motion of the panel. The tab 258 abuts the upper edge of the recess 240 to prevent mallocation of the panel. Further, the tab 258 will not fit under one of the snaps 238 when the panel 236 is inappropriately inverted.

The face plate 16 is also provided at its upper edge with a structural wall 260 which joins to corner elements 262 and 264 each having angled elements 266 and 268 respectively formed thereon, this structure cooperating with opposed structure on the frame 14 as described above to further strengthen the housing 12.

Back Panel Mounting Arrangement

Figure 10A:
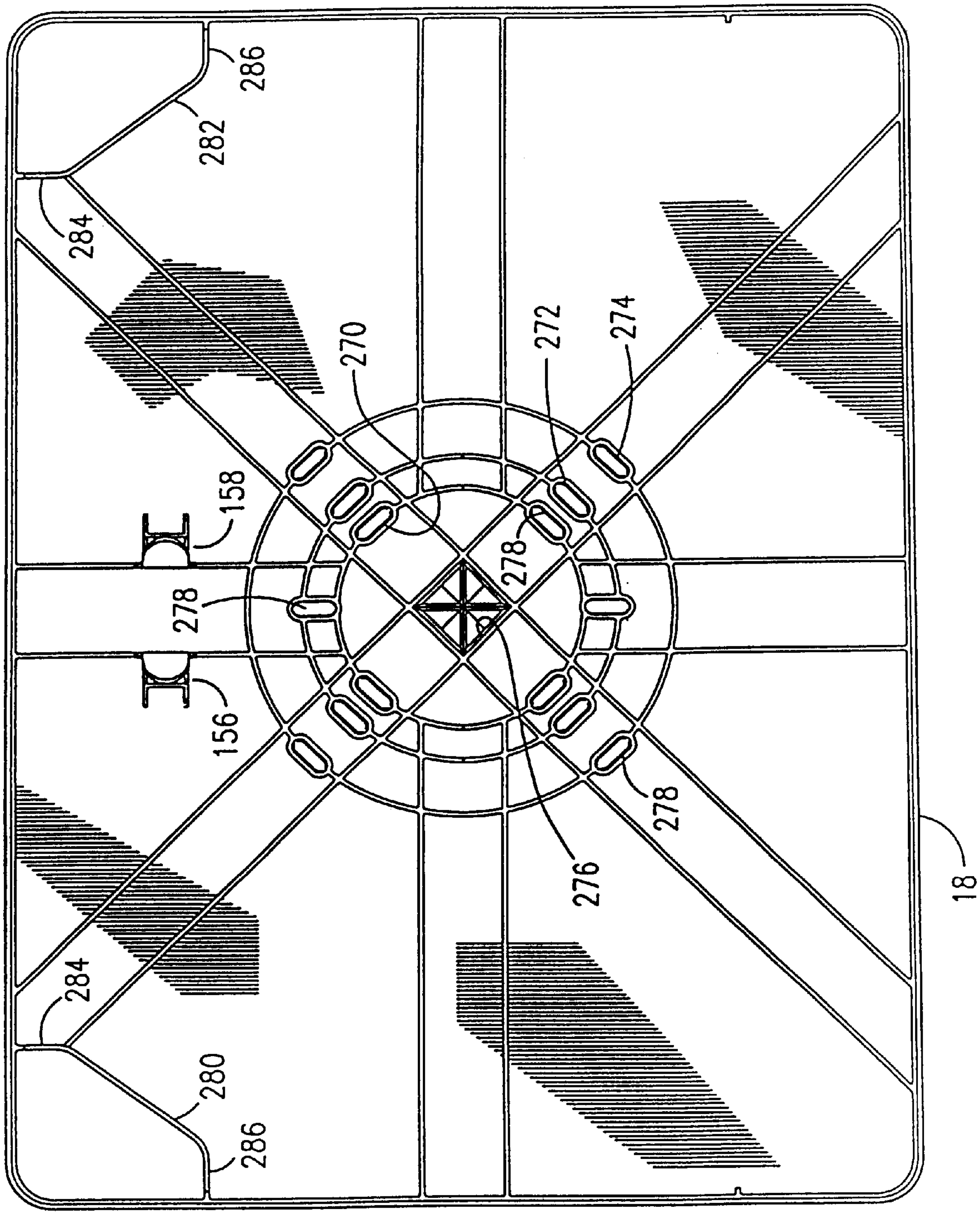
FIGS.10A and 10B are view of the back plate of the invention intended for wall mounting of the fixtures.
Figure 10B:
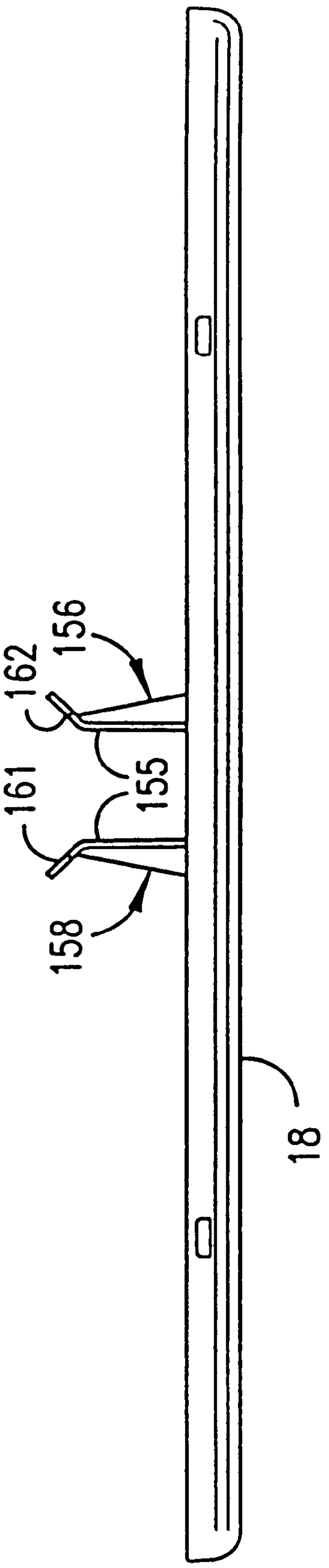
Figure 11A:
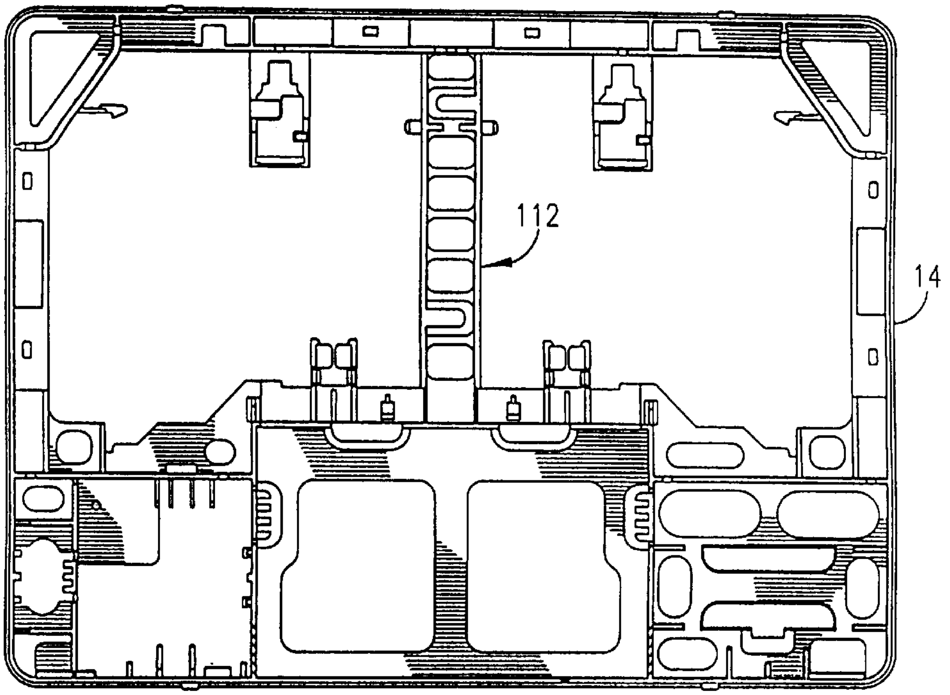
FIG. 11A is a front elevational view of the frame of the invention.
Figure 11B:
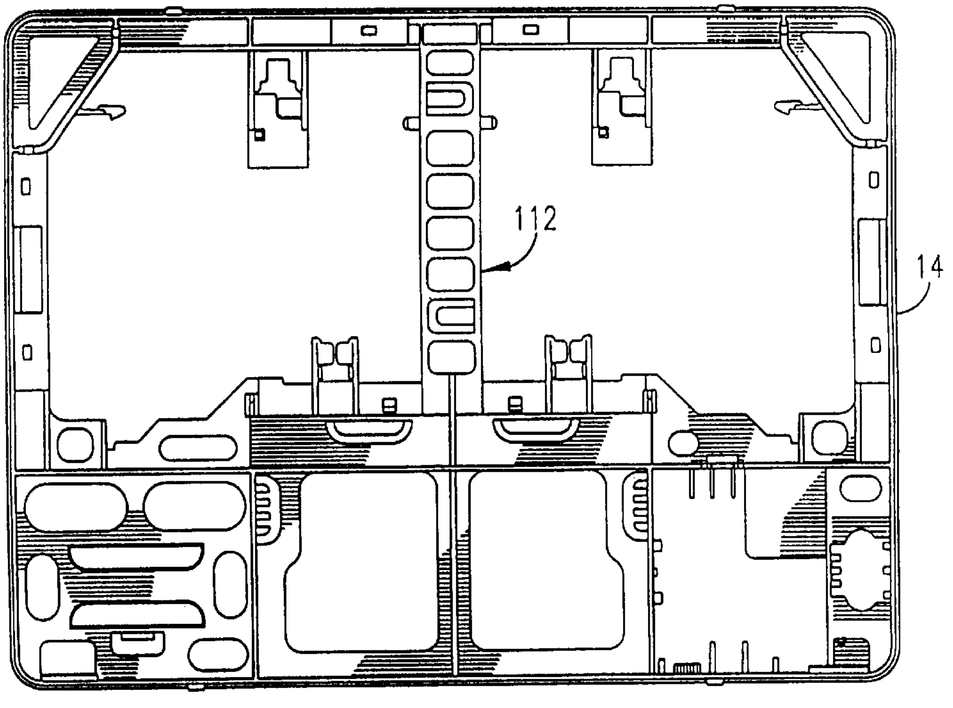
FIG. 11B is an elevational view taken from the rear of the frame of the invention.

Referring to FIGS. 10A and 10B, the back panel 18 is seen to be formed with knock outs 270, 272 and 274 as well as with a center channel knock out 276. The knock out 276 is removed when the back panel 18 is to be used to directly mount the combo fixture 10 to a wall (not shown). A J-box (not shown) in a wall is fitted with a bracket (not shown) as is conventional and the appropriate knock out 270, 272 or 274 corresponding to the size of the J-box is knocked out by removing the plastic flashing within ovals 278 associated with a particular ring of the knock outs. The back plate 18 is then mounted to the J-box and bracket (not shown). The frame 14 is then mounted to the back plate 18 with peg elements 152 being received within apertures 155 formed in the snap elements 158 and 160 extending from the inner face of the back plate 18. Housing 12 is thus snap-fitted to the back plate 18 to mount substantial portions of the weight of the combo fixture 10 in tension. Angled ramps 161 and 163 provide lead-ins to engage the peg elements 152 in the apertures 155.

The back plate 18 is formed at upper corners thereof with structural corner plates 280 and 282 each having angled elements 284 and 286 respectively formed thereon, the structure cooperating with opposed structure of the frame 14 as described above to further strengthen the housing 12.

Unit Lamp Mounting Arrangement

Figure 24:
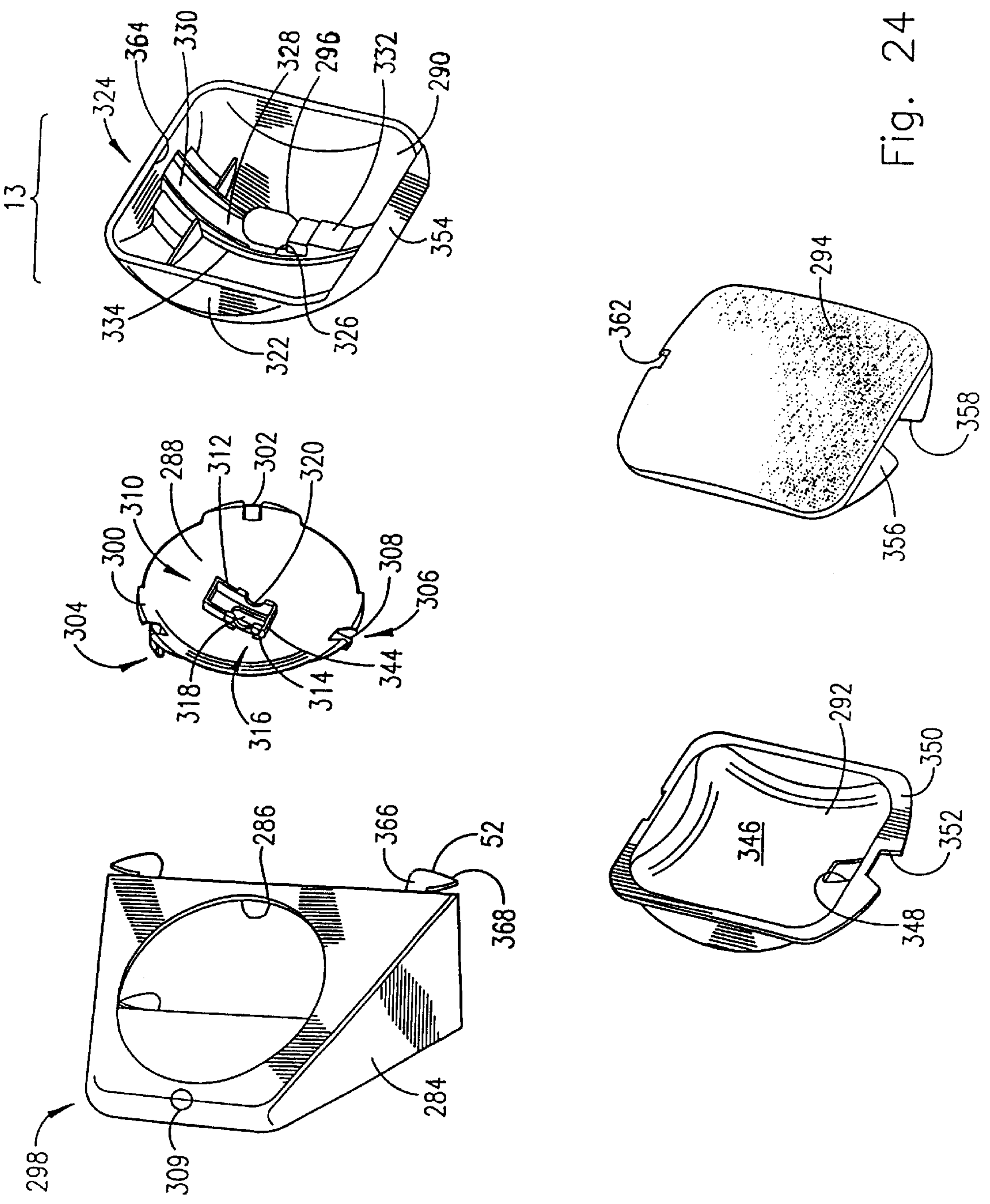
FIG. 24 is an assembly view of components comprising the repositionable emergency lighting unit lamp assembly.
Figure 25A:
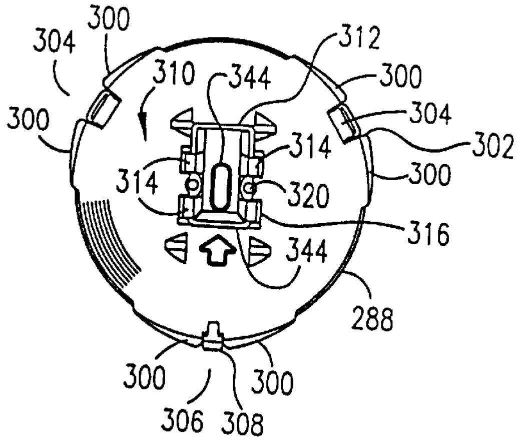
FIGS. 25A–25C are views of the apparatus of FIG. 24.
Figure 25B:
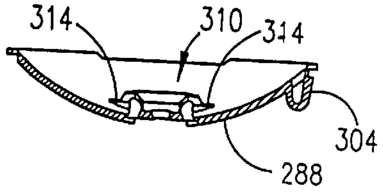
Figure 25C:
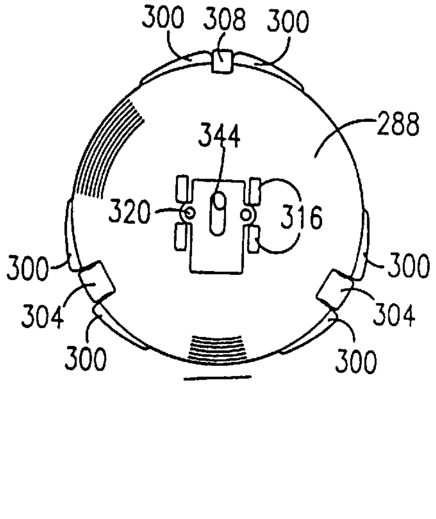
Figure 26A:
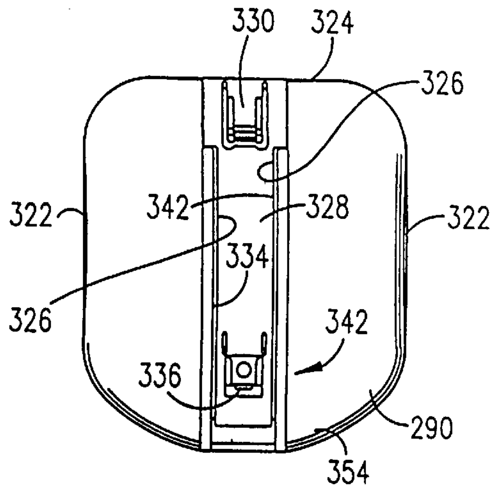
FIGS. 26A–26C are views of the apparatus of FIG. 24.
Figure 26B:
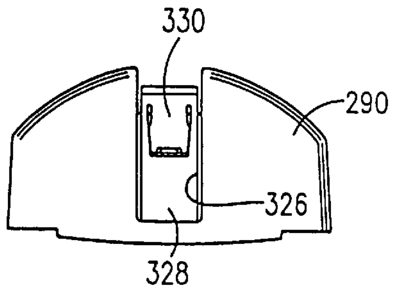
Figure 26C:
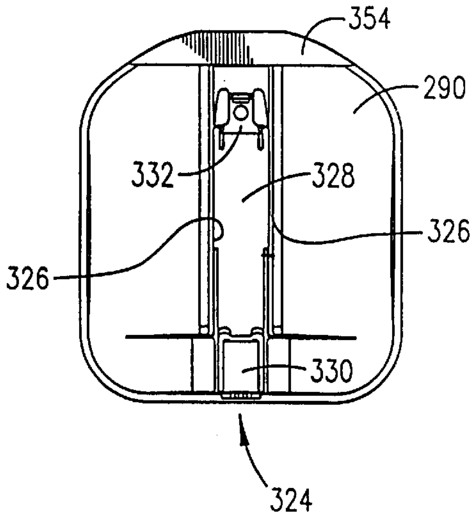
Figures 27A, 27C, 27E:
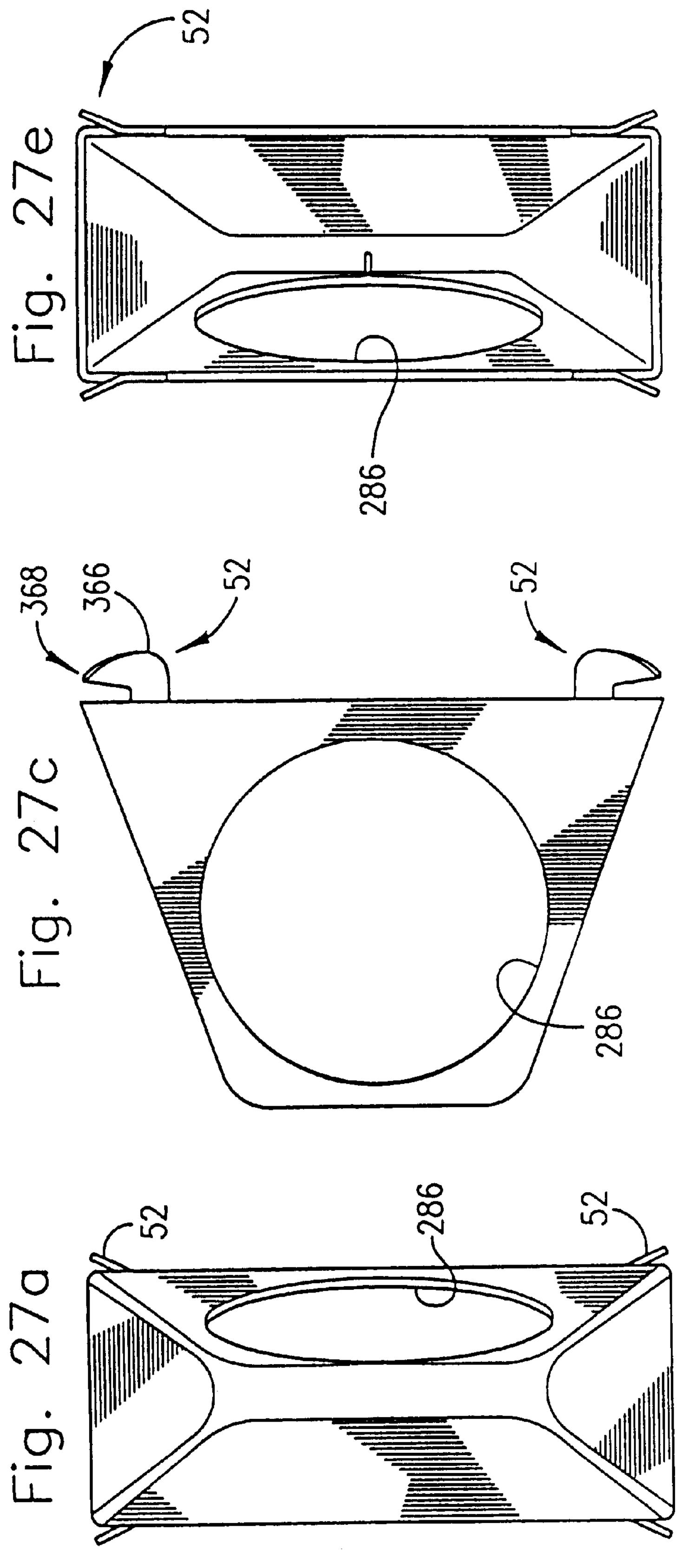

Referring now to FIGS. 24 and 25 , one of the emergency lighting unit lamp assemblies 13 is seen to comprise a lamp holder 284 having an opening 286 formed in at least one major face thereof, an arcuate swivel plate 288 having the general shape of a spherical segment and being receivable within the opening 286 and snap-fitted thereinto for swiveling motion in said opening 286, a lamp housing 290 which snap-fits onto the swivel plate 288 for movement relative to said plate 288, a parabolic reflector 292 and a lens 294. A bulb 296 preferably comprising a T5 wedge base incandescent lamp manufactured by the General Electric Corporation is mounted to the lamp housing 290 and is activated on failure of AC line voltage and driven by DC power supplied by the battery 30, the battery 162 or a Ni—Cd battery as aforesaid. The structure of one of the assemblies 13 sufficies for description of any other one of the assemblies 13 since the assemblies are essentially identical.

The lamp holder 284 comprises a stationary platform mounted to the frame 14 by insertion of the four torsion snaps 52 into any one of the patterns of four of the slots 50. The lamp holder 284 is thus quickly mountable to the frame 14 and readily removed from the frame. The lamp holder 284 preferably takes the form of front and rear angled surfaces which outwardly terminate at 298. Triangular lateral surfaces of the lamp holder 284 complete the shape of the lamp holder 284. It is to be understood that the lamp holder 284 can be otherwise shaped as long as at least one major surface is available for formation of the opening 286 therein. It is also to be understood that an opening such as the opening 286 could be formed in the other major surface of the lamp holder 284 so that additional lamping could be carried by the lamp holder 284 as seen generally in FIGS. 3 and 4 inter alia. Four of the torsion snaps 52 are formed on base edges of the lamp holder 284 and are positioned thereon to mate with the slots 50 as aforesaid.

The swivel plate 288 is provided with pairs of lands 300 placed about the periphery of said plate 288, three pairs of the lands 300 being adequate for support of the plate 288 within the opening 286 of the lamp holder 284. The lands 300 prevent the plate 288 from falling into the interior of the holder 284 and facilitate swiveling motion of the plate 288 within the opening 286. Cut-outs 302 are formed between two pair of the lands 300. Each of the cut-outs 302 has a U-shaped snap 304 located within the cut-out 302, the snaps 304 facilitating the snap-fitting of the plate 288 into the opening 286 of the lamp holder 284, movement of the plate 288 within the opening 286 being also thus facilitated. The third pair of the lands 300 is spaced equidistantly from the two pair of lands 300 having the cut-outs 302 formed therein, a T-shaped cut-out 306 being formed between the lands 300 of this third pair of lands. A prong 308 is formed immediately behind the cut-out 306, the prong 308 acting to hold the plate 288 within the opening 286 and to provide a stop function in concert with detent 309 located interiorly of the lamp holder 384. A guide track assembly 310 is formed centrally of the spherical swivel plate 288 and comprises a base 312 having spaced pairs of spaced track tangs 314 which surmount one each of a slot 316 in a pattern of the slots 316, the slot pattern being rectangular in conformation. An oval slot 318 is formed in the plate 288 centrally thereof and within the assembly 310, one each of a pair of apertures 320 being formed in the plate 288 on opposite sides of the oval slot 318 and between vertically related slots 316 of the pairs of slots 316. At least certain of the openings thus formed in the swivel plate 288 facilitate passage of wiring (not shown) from a bulb socket 297 into the interior of the lamp holder 284.

The lamp housing 290 is formed as a spherical segment which is concentric with the spherical shape of the swivel plate 288, the spherically shaped rear walls of the lamp housing 290 being received into the concentrically formed spherical concavity of the swivel plate 288 to cause the assembled unit to exhibit a low profile. Flats 322 are formed parallel to each other at spaced edges of the lamp housing 290 with a perpendicularly disposed flat 324 being also formed at the edge of the lamp housing 290. An arcuate slot 326 formed centrally of the lamp housing 290 and extending from the flat 324 to the edge of the lamp housing 290 opposite the flat 324. An arcuate bridge 328 extends immediately below the slot 326 and is formed with a snap detent 330 therein immediately interiorly of the flat 324, the detent 330 having a spring capability such that the detent 330 snaps back to its original position after being biased inwardly of the housing 290 on fitting of the swivel plate 288 to the lamp housing 290. The bridge 328 is further formed with a bulb base mount 332 near the end thereof opposite the detent 330. The mount 332 is formed of spaced track elements 334 with a depressable tongue 336 being disposed between the track elements 334. The bulb 296 is mounted by a socket base 338 having a plate 340 extending from the base 338 to fit under the track elements 334 and being held therebetween by the tongue 336 which is depressed downwardly on insertion of the plate 340 between the track elements 334 and which rebounds to bias against the plate 340 to maintain the base mount 332 and thus the bulb 296 in place. Track following edges 342 of the lamp housing 290 which define the slot 326 are received under the tangs 314 of the guide track assembly 310 on the swivel plate 288 to allow the lamp housing 290 to move in an are relative to the swivel plate 288 essentially along a detent of that circle-like geometric shape defined by the periphery of the swivel plate 288. When the lamp housing 290 is fully received by the guide track assembly 310, the detent 330, which detent 330 is depressed as the lamp housing 290 is received by said guide track assembly 310, is released and springs back to engage a wall 344 of the assembly 310 to prevent disengagement of the lamp housing 290 from the swivel plate 288 without first depressing the detent 330.

A reflector 292 is received within the lamp housing 290, the reflector 292 comprising a plastic structure which is coated with a reflective layer 346. The reflector 292 is formed as a parabola of rotation which fits within the lamp housing 290 and is received within the housing 290. An opening 348 formed in the reflector 292 allows the bulb base mount 332 of the lamp housing 290 to extend therethrough to be exposed for its intended purpose. The periphery of the reflector 292 is shaped to fit the shape of the lamp housing with a flange 350 having a cut-out 352 being formed at the periphery of the reflector 292 adjacent the opening 348, the cut-out 352 receiving an end of the bridge 328 of the lamp housing 290. Portions of the flange 350 are received under a peripheral segment 354 formed on the lamp housing 290, the segment 354 being connected to that end of the bridge 328 received by the cut-out 352.

The lens 294 snap-fits onto the lamp housing 290, the periphery of the lens being shaped to fit the shape of the lamp housing. A flange 356 having a cut-out 358 is formed on one edge of the lens 294, the cut-out 358 receiving an end of the bridge 328 of the lamp housing 290. Portions of the flange 356 are received under the peripheral segment 354 of the lamp housing 290 to facilitate holding of the lens 294 to the lamp housing 290. A snap 360 formed in the lens 294 opposite the flange 356 snaps the lens 294 onto the lamp holder 290 in cooperation with a cut-out 362 formed in the reflector 292 and snap fingers 364 formed on the lamp holder 290 and received into the cut-out 362. The lens 294 can be “frosted” if desired to provide a more diffuse light.

The lamp assembly 13 is seen to mount to the frame 14 of the housing 12 by means of the torsion snap 52 fitting into the slots 50. Each of the torsion snaps 52 are essentially plow-shaped with a rounded shank 366 extending directly from the lamp holder 284, distal end 368 of the snap 52 tapering to a point and being outwardly angled medially of the shank 366. The torsion snaps 52 on insertion into the slots 50 actually act to pull the lamp holder 284 to the housing 12. When the snaps 52 are inserted into the slots 50, the snaps 52 are bent straight in order to fit into said slots 50. While the snaps 52 are formed of a plastic material, the snaps 52 are resistant to creeping. Even if the snaps 52 creep, the degree of creep will not be sufficient to cause the snaps 52 to creep to clearance, that is, the snaps 52 will not deform over time to allow the snaps 52 to straighten sufficiently to fall from the slots 50.

The concentrically spherical arrangement of the swivel plate 288 and the lamp housing 290 allow an optimized degree of freedom while allowing a low profile of the assembly 13. The assembly 13 is therefore compact volumetrically while being adjustable in position over a wide angular range. The degree of angular freedom is constrained by stop structure as described above which prevents wire breakage.

Electrical Systems

Figure 12:
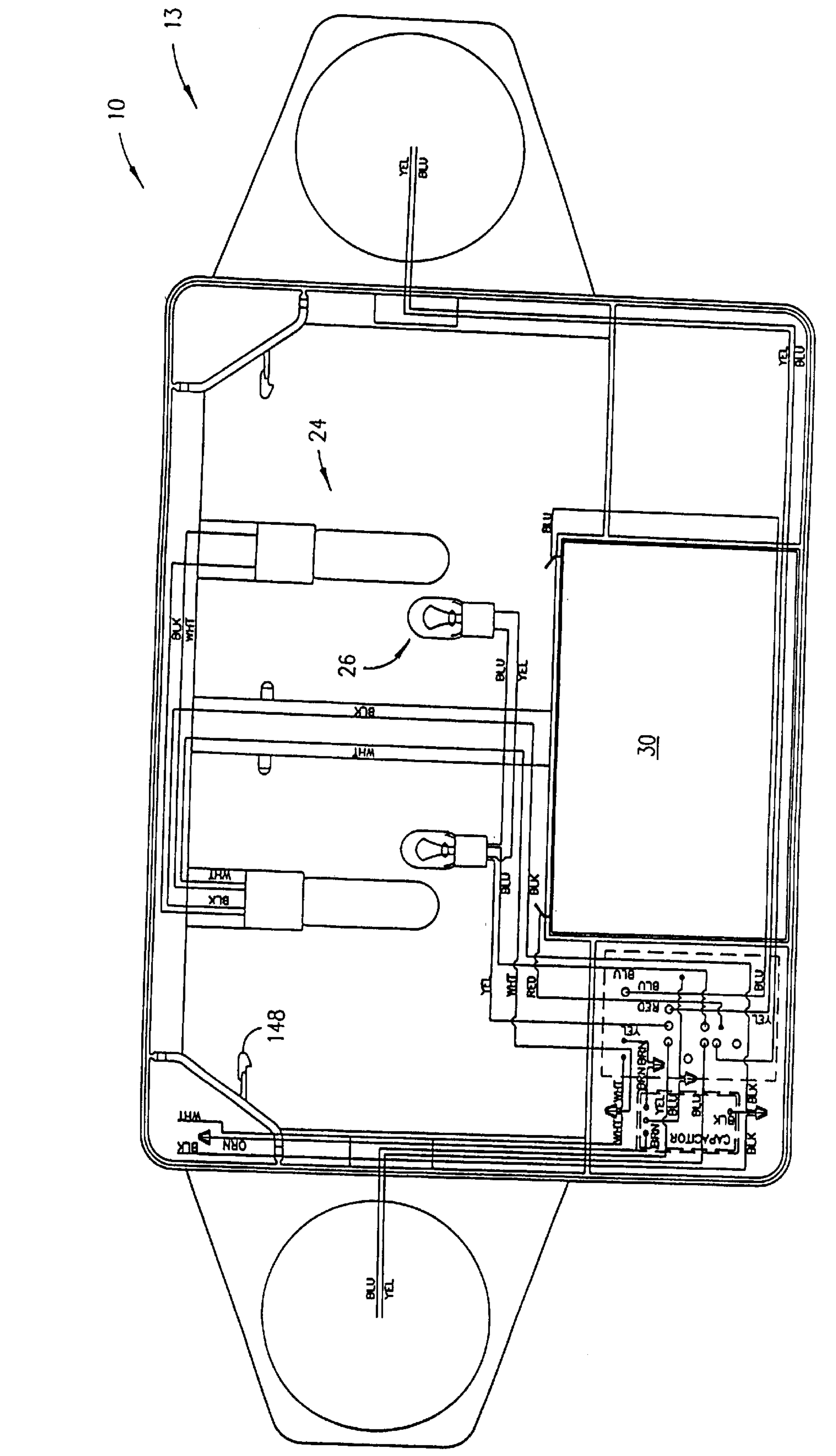
FIG. 12 is a front elevational view of the invention partially in schematic illustrating an incandescent embodiment of the invention.
Figure 13:
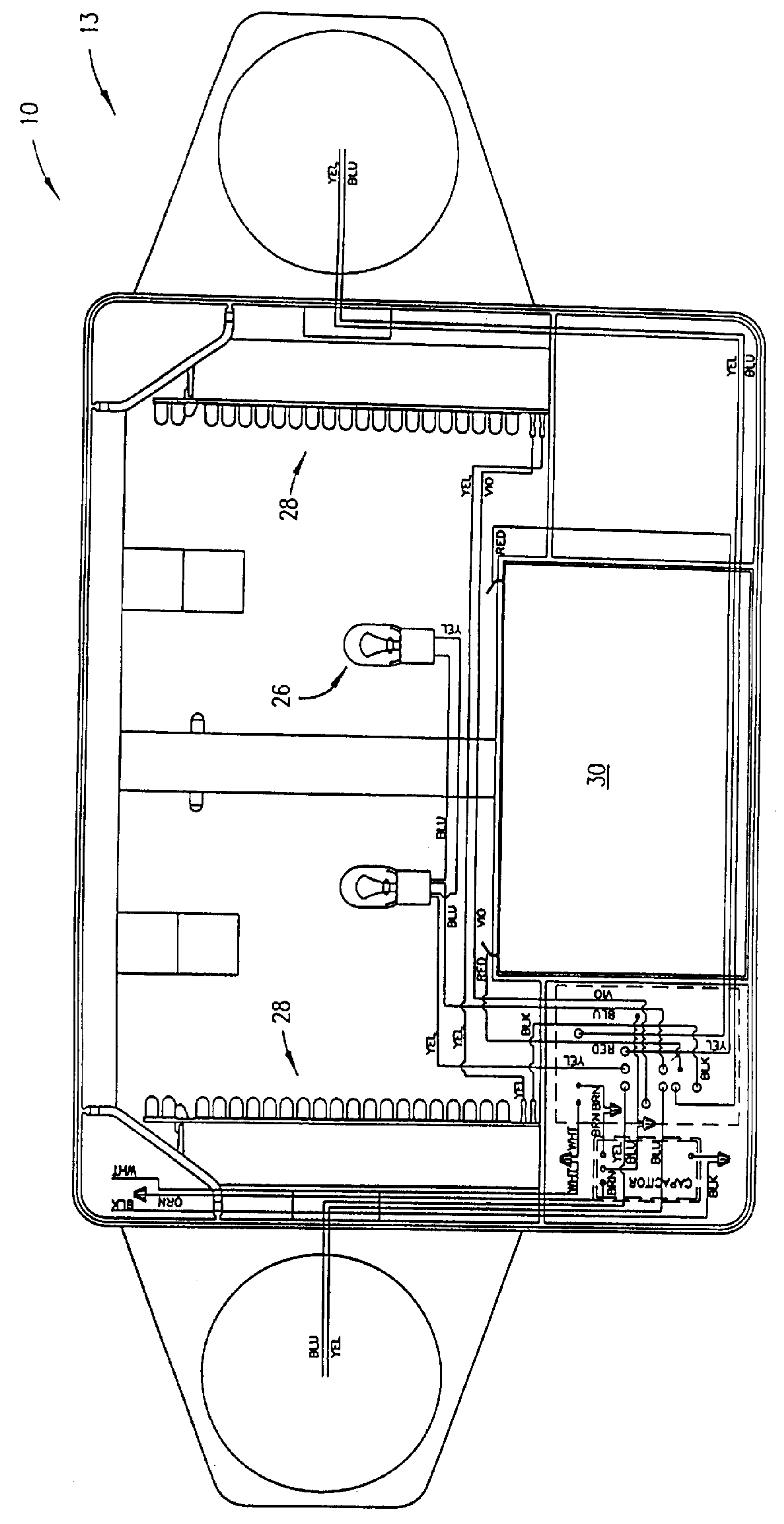
FIG. 13 is a front elevational view partially in schematic illustrating an LED/incandescent embodiment of the invention.
Figure 28:
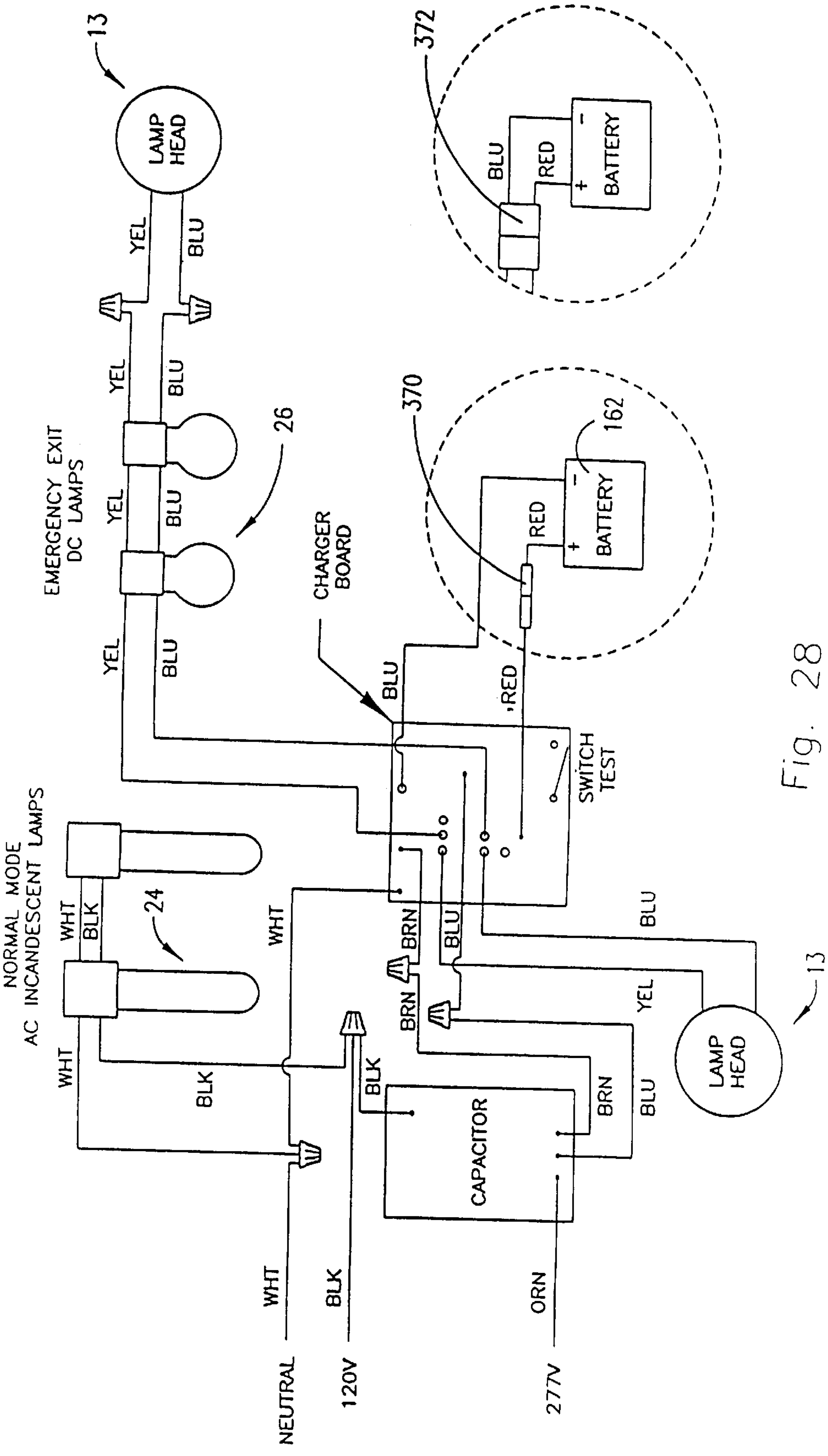
FIG. 28 is a simplified diagram of the circuitry of the invention.

Referring now to FIGS. 12 and 28, the circuitry employed in the incandescent embodiment of the invention is shown. The circuit is disclosed in co-pending U.S. patent application Ser. No. 08/519,804, filed Aug. 28, 1995, by James C. Johnson, and entitled Emergency Lighting Battery Charging Circuit, the pending application for patent being assigned to the assignee of the present application for patent. The disclosure of Ser. No. 08/519,804 now U.S. Pat. No. 5,646,502, is incorporated hereinto by reference. FIG. 28 comprises a wiring diagram which particularly shows the use of a single pole battery connector 370 used with a lead-acid battery such as the battery 30. When the Ni—Cd battery is used as seen in FIG. 28, a polarized battery connector 372 is utilized. FIG. 13 illustrates mounting of the LED arrays 28 on opposite sides of the housing 12. The arrays 28 provide non-emergency lighting of the indicia 20 on AC mains power. When the arrays 28 are used, the AC lamps 24 are eliminated.

Particular embodiments of the invention have been described above in relation to illustrations of a preferred combo fixture 10 as provided in the drawings. However, it is to be understood that the invention can be embodied other than as is described and shown herein. The invention can particularly be used in the construction of emergency lighting fixtures other than combination exit sign/emergency unit fixtures. Accordingly, the scope of the invention is defined by the recitations of the appended claims.

What is claimed is:

1. A combination exit sign and emergency lighting unit having at least one emergency lighting unit assembly mountable to an exit sign portion of the combination, at least the exit sign portion of the combination being formed of a polymeric material and having wall portions formed of a relatively low thickness relative to wall portions of a conventional exit sign and emergency lighting unit formed of a polymeric material in order to cause the combination to be of a low weight, the exit sign portion having sufficient structural integrity to provide a necessary rigidity even though formed of a relatively thin polymeric material subject to deformation and the like when subjected to loading such as is occasioned by the weight of the combination exit sign and emergency lighting unit.

2. The combination of claim 1 and further comprising means carried by at least the exit sign portion for imparting structural integrity to the combination to enable said combination to be formed of sufficiently thin material capable of providing a necessary rigidity to the combination to cause said combination to be suitable for use.

3. The combination of claim 1 and further comprising a structural web formed integrally with inner walls of at least the exit sign portion.

4. The combination of claim 1 and further comprising a structural web formed integrally with inner walls of at least the exit sign portion.

5. The combination of claim 1 wherein the exit sign portion bears the weight of the combination to support the combination.

6. The combination of claim 1 wherein the exit sign portion comprises a housing for the combination, the combination being housed by the single housing.

7. The combination of claim 1 and further comprising means for removably mounting the emergency lighting unit assembly to the exit sign portion of the combination.

8. The combination of claim 7 wherein the mounting means comprises means for swiveling the assembly relative to the combination.

9. The combination of claim 1 wherein batteries for providing power to the combination in the event of failure of mains power to the combination are disposed within a housing formed at least partially by the wall portions of the exit sign portion of the combination, the weight of the batteries comprising a portion of the weight of the combination which is supported by the combination exit sign and emergency lighting unit.

10. A combination exit sign and emergency lighting unit having circuitry components comprising at least one battery, interior lamping producing exit sign function, and circuitry elements forming at least one circuit with at least the one battery and the interior lamping, the combination having a housing formed of a polymeric and relatively low gauge material in order to cause the combination to be of a low weight yet having sufficient structural integrity to support the circuitry components, and at least one emergency lighting unit assembly mounted to the housing exteriorly thereof for providing emergency unit illumination.

11. The combination of claim 10 wherein the housing bears the weight of the combination to support the combination.

12. The combination of claim 10 and further comprising means for removably mounting the emergency lighting unit assembly to the housing.

13. The combination of claim 12 wherein the mounting means comprises means for mounting the assembly for swiveling motion relative to the combination.

14. The combination of claim 10 wherein the housing comprises support means for carrying at least major portions of the circuitry components, the support means being formed of a plastic material.

15. The combination of claim 10 and further comprising support means mounted by the housing for carrying at least major portions of the circuitry components, the housing and the support means being formed of a plastic material.

16. The combination of claim 15 wherein the support means is integrally formed with the housing.

17. The combination of claim 10 and further comprising a structural web formed integrally with inner walls of the housing.

18. The combination of claim 10 wherein the housing comprises an exit sign portion of the combination, the circuitry components being disposed within the confines of the exit sign portion of the combination.

19. A combination exit sign and emergency lighting fixture comprising:

a housing comprising at least three mounting locations adapted for mounting an emergency lighting assembly to the housing, wherein each mounting location comprises a plurality of openings adapted to receive and engage a plurality of corresponding projections on the emergency lighting assembly;

at least one emergency lighting assembly mounted to the housing at one of the mounting locations; and an exit sign on at least one side of the housing, wherein the remaining components of the combination are contained inside the housing and the housing bears the weight of the combination to support the combination.

20. The combination exit sign and emergency lighting fixture of claim 19, wherein the housing and assembly comprise plastic.

21. The combination exit sign and emergency lighting fixture of claim 19, wherein projections on the emergency lighting assembly comprise torsion snap elements angled to positively engage the opening into which the projection is received and engaged when the emergency lighting assembly is mounted onto the housing.

22. A combination exit sign and emergency lighting unit fixture having circuitry components comprising at least one battery, at least one interior lamp, and circuitry elements forming at least one circuit with the at least one battery and interior lamp, the combination comprising:

a housing comprising plastic and at least three mounting locations adapted for mounting an emergency lighting assembly to the housing, wherein the housing supports at least some of the circuitry components; and at least one emergency lighting assembly mountable in at least one of the mounting locations.

23. The combination exit sign and emergency lighting unit fixture of claim 22, wherein the emergency lighting assembly is snap-fitted into the at least one mounting location.

24. The combination exit sign and emergency lighting unit fixture of claim 22, wherein the at least one of the mounting locations comprises a plurality of openings adapted to receive and engage a plurality of corresponding projections on the emergency lighting assembly.

25. The combination exit sign and emergency lighting unit fixture of claim 24, wherein the projections comprise torsion snap elements angled to positively engage the respective openings formed in the housing into which the projections are received and engaged when the assembly is mounted onto the housing.

26. The combination of claim 10 wherein the circuitry components are disposed within the confines of the housing.

27. The combination of claim 10 wherein the mounting means comprises means for mounting the assembly for swiveling motion relative to the combination.

28. A combination exit sign and emergency lighting unit having circuitry components comprising at least one battery, interior lamping producing exit sign function and circuitry elements forming at least one circuit with at least the one battery and the interior lamping, the combination having a housing formed of a polymeric and relatively low gauge material in order to cause the combination to be of a low weight yet having sufficient structural integrity to support the circuitry components, and further comprising support means mounted by the housing for carrying at least major portions of the circuitry components, the housing and the support means being formed of a plastic material, the support means being integrally formed with the housing.

29. A combination exit sign and emergency lighting unit having circuitry components comprising at least one battery, interior lamping producing exit sign function, and circuitry elements forming at least one circuit with at least the one battery and the interior lamping, the combination having a housing formed of a polymeric and relatively low gauge material in order to cause the combination to be of a low weight yet having sufficient structural integrity to support the circuitry components, and further comprising a structural web formed integrally with inner walls of the housing.

30. A combination exit sign and emergency lighting unit having circuitry components comprising at least one battery, interior lamping producing exit sign function, circuitry elements forming at least one circuit with at least the one battery and the interior lamping, the combination having a housing formed of a polymeric and relatively low gauge material in order to cause the combination to be of a low weight yet having sufficient structural integrity to support the circuitry components, and at least one emergency lighting unit assembly mounted to the housing for providing emergency unit illumination.

31. A combination exit sign and emergency lighting fixture, comprising:

a plastic housing comprising:

a frame having an inside, an outside, a front and a back;

a removable face plate having indicia mounted to the front of the frame;

a removable back plate mounted to the back of the frame; and at least three mounting locations;

at least one light emitting component inside the frame for illuminating the indicia;

at least one emergency lighting assembly mounted on the outside of the frame at one of the at least three mounting locations; and at least one battery and associated circuitry mounted inside and supported by the frame for supplying power to the light emitting component and the emergency lighting assembly during a power failure.

* * * * *